(12) United States Patent
Azema

(10) Patent No.: US 6,287,718 B1
(45) Date of Patent: Sep. 11, 2001

(54) PROTECTION DEVICE AND BATTERY CELL USING THIS PROTECTION DEVICE

(75) Inventor: Tadamitsu Azema, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/167,365

(22) Filed: Oct. 7, 1998

Related U.S. Application Data

(62) Division of application No. 08/499,051, filed on Jul. 6, 1995, now Pat. No. 6,120,928.

(30) Foreign Application Priority Data

Jul. 7, 1994 (JP) .................................................. 6-179619

(51) Int. Cl.⁷ .................................................. H01M 10/48
(52) U.S. Cl. .................................. 429/61; 429/7; 429/90; 200/61.08
(58) Field of Search ................................ 429/61, 57, 90, 429/7; 200/61.08

(56) References Cited

U.S. PATENT DOCUMENTS

| | | |
|---|---|---|
| 4,943,497 | 7/1990 | Oishi et al. . |
| 5,543,246 | 8/1996 | Treger . |
| 5,705,290 * | 1/1998 | Azema . |
| 5,766,791 * | 6/1998 | Takahashi et al. . |
| 6,063,518 * | 5/2000 | Dewulf et al. . |
| 6,120,928 * | 9/2000 | Azema . |

* cited by examiner

Primary Examiner—John S. Maples
(74) Attorney, Agent, or Firm—Brinks Hofer Gilson & Lione

(57) ABSTRACT

A protection device for preventing swelling or breakage of a battery cell in response to over-charging and/or an over-current condition. The protection device is connected between an internal electrode and an external electrode within the battery cell and includes an electrically insulating casing and an electrically insulating and flexing lid member for sealing an inner portion of the casing. A breakable electrically conductive member is positioned within the sealed inner portion that electrically connects wiring members. The lid member includes a projection which abuts against a central portion of the electrical conductive member. In an over-charge or over-current condition, increased pressure within the battery cell causes the projection of the lid member to press against the electrically conductive member, thereby causing the electrically conductive member to break such that the electrical connection between wiring members is broken.

5 Claims, 14 Drawing Sheets

PROTECTION DEVICE AND BATTERY CELL USING THIS PROTECTION DEVICE

This application is a divisional of U.S. Ser. No. 08/499,051, filed Jul. 6, 1995, now U.S. Pat. No. 6,120,928.

BACKGROUND OF THE INVENTION

1. Field of the Invention

This invention relates to a protection device used for assuring a safe operation of a rechargeable battery, such as a secondary cell or the like, and a battery cell provided with this protection device.

2. Description of the Related Art

When a charging is further continued even after the charging is completed in a rechargeable battery cell or when a charging is carried out with a higher level of current than that of a predetermined current, it sometimes occurs that an abnormal state is generated in the battery cell to produce gas within the battery cell, either an air pressure or a temperature within the battery cell is increased and extrusion of electrolyte caused by expansion or cracks of the battery cell corrode equipment assembled with the battery cell. In addition, a continuation of this use of the battery cell under such a condition even though corrosion may not occur causes a possibility in which the battery cell is bulged out, a crack or a breakage is generated in the battery cell and so the use of the battery cell in which a certain abnormal state is produced should be stopped immediately.

In view of the foregoing, a rechargeable battery cell is provided with various kinds of safety countermeasures such as a safety valve arranged in it to discharge gas in the battery cell in response to an increased air pressure within the battery cell or alternatively means arranged out of the battery cell for sensing the increased temperature and preventing an electric current from flowing to an electrical circuit to which the battery cell is connected.

However, in the case that the safety valve was required to be installed in the battery cell, a piping or the like in the battery cell had to be considered and this became a restriction on designing the battery cell or in the case of the type in which an increasing of temperature within the battery cell was detected, there was a possibility in which the battery cell was used again when the temperature was decreased as time elapsed.

SUMMARY OF THE INVENTION

The present invention has been completed in view of the foregoing, and it is an object of the present invention to provide a protection device and a battery cell using this protection device in which a degree of freedom in design of the battery cell can be improved and a use of the battery cell having an abnormal state of increased air pressure within the battery cell can be positively terminated.

As a first means for accomplishing the aforesaid object, the protection device of the present invention is provided with a casing and a lid member one of which has a flexibility, wherein each of the aforesaid casing and the aforesaid lid member are electrically conductive, an electrical conducting passage is arranged between the aforesaid casing and the aforesaid lid member, the aforesaid casing and the aforesaid lid member are electrically connected by the aforesaid electrical conductive passage, the aforesaid electrical conductive passage is broken so as to cut off an electrical conduction between the aforesaid casing and the aforesaid lid member.

As a second means for accomplishing the aforesaid object, the protection device of the present invention is provided with a casing and a lid member one of which has a flexibility characteristic, each of the aforesaid casing and the aforesaid lid member has an insulating characteristic, an electrical conductive passage is arranged between the aforesaid casing and the aforesaid lid member, a pair of wiring members are arranged in the aforesaid electrical conductive passage, the aforesaid pair of wiring members are extended out of the aforesaid casing, the aforesaid electrical conductive passage is broken under a flexing of either the aforesaid casing or the aforesaid lid member caused by the external pressure and then the electrical conduction between said pair of wiring members is cut off.

In addition, as a third means for accomplishing the aforesaid object, the protection device of the present invention is comprised of an electrical conductive hollow casing, an electrical conductive passage stored in the aforesaid casing, a holding member having resiliency and insulating characteristics stored in the aforesaid casing and holding the aforesaid electrical conductive passage, and a lid member having flexibility, wherein the aforesaid casing is connected to the aforesaid lid member through the aforesaid holding member is such a way that the hollow part of the aforesaid casing is sealingly closed, and at the same time, the aforesaid electrical conductive passage is held by the aforesaid lid member and the aforesaid casing, the aforesaid casing and the aforesaid lid member are electrically connected by the aforesaid electrical conductive passage, the aforesaid lid member is provided with a projection at a location oppositely faced to a point near a central part of the aforesaid electrical conductive passage while being abutted against the aforesaid electrical conductive passage, the aforesaid projection breaks the aforesaid electrical conductive passage so as to cut off an electrical conduction between the aforesaid casing and the aforesaid lid member.

In addition, as a fourth means for accomplishing the aforesaid object, the protection device of the present invention is comprised of an insulating hollow casing, an electrical conductive passage stored in the aforesaid casing, a pair of wiring members connected to the aforesaid electrical conducting passage and electrically connected through the aforesaid electrical conductive passage, a holding member having resiliency and insulating characteristics stored in the aforesaid casing and for holding the aforesaid electrical conductive passage, and a lid member having flexibility and insulating characteristics, wherein the aforesaid lid member is connected to the aforesaid holding member through the aforesaid holding member in such a way as the hollow part of the aforesaid casing is sealingly closed, the aforesaid electrical conductive passage is held by the aforesaid casing and the aforesaid holding member, the aforesaid wiring members are extended out of a space sealingly closed by the aforesaid casing, the aforesaid holding member and the aforesaid lid member, the aforesaid lid member is provided with a projection while being abutted against the aforesaid electrical conductive passage at a location opposing against a part near a central part including the central part of the aforesaid electrical conductive passage, the aforesaid projection breaks the aforesaid electrical conductive passage under a flexing of the aforesaid lid member with an external pressure so as to cut off an electrical conduction between the aforesaid pair of wiring members.

In addition, at the third and fourth means, a bottom surface of the aforesaid lid member is formed with a projection part projected inwardly of the aforesaid casing at a position opposing against the aforesaid electrical conductive passage, and the aforesaid projection is provided with a convex part.

In addition, in the third means, each of the aforesaid casing and the aforesaid lid member is provided with an electrical conductive foil so as to cause an electrical conduction to be attained and the aforesaid metallic foil is applied as an external pulling-out terminal in the aforesaid electrical conductive passage.

In addition, in the fourth means, the aforesaid electrical conductive passage is made such that an electrode is formed at the surface of a ceramic substrate.

In addition, in the fourth means, the aforesaid electrical conductive passage and the aforesaid wiring members are integrally formed.

In addition, the protection device in the third means is installed within the battery cell, the internal and external electrodes of the aforesaid battery cell are connected to the aforesaid casing and the aforesaid lid member so as to cause the aforesaid internal electrode and the aforesaid external electrode to be electrically conductive through the aforesaid electrical conductive passage.

In addition, the protection device in the fourth means is arranged within the battery cell, the aforesaid wiring members are connected to the internal and external electrodes of the aforesaid battery cell, and the aforesaid internal electrode and the aforesaid external electrode are made electrically conductive through the aforesaid electrical conductive passage.

According to the aforesaid first means, it is possible to break the aforesaid electrical conductive passage and to cut off an electrical conduction between the aforesaid casing and the aforesaid lid member under flexing of either the aforesaid casing or the aforesaid lid member with the external pressure.

In addition, according to the aforesaid second means, it is possible to cut off an electrical conduction between said pair of wiring members by breaking the aforesaid electrical conductive passage with flexing of either the aforesaid casing or the aforesaid lid member under application of the external pressure.

According to the aforesaid third means, it is possible to cut off an electrical conduction between the aforesaid casing and the aforesaid lid member under a breakage of the aforesaid electrical conductive passage by the projection part arranged in the aforesaid lid member.

According to the aforesaid fourth means, it is possible to cut off an electrical conduction between the aforesaid pair of wiring members by breaking the aforesaid electrical conductive passage with the projection arranged in the aforesaid lid member under application of an external pressure.

In addition, in the third and fourth means, it is possible to reduce a rigidity force of the aforesaid lid member by forming a projection projecting inwardly of the aforesaid casing at a location opposing against the central part of the aforesaid electrical conductive passage of the aforesaid lid member and by arranging a convex part at the aforesaid projection.

In addition, in the third means, each of the aforesaid casing and the aforesaid lid member is provided with a conductive foil to cause them to be conductive to each other, the aforesaid metallic foil is applied as an external pulling terminal of the aforesaid conductive passage, thereby its connection with the external device can be facilitated.

In addition, in the fourth means, the aforesaid electrical conductive passage forms an electrode on the surface of a ceramic substrate, thereby the aforesaid convex part arranged at the aforesaid lid member can break the aforesaid electrical conductive passage.

In addition, in the fourth means, the aforesaid electrical conductive passage and the aforesaid wiring members are integrally arranged, thereby the number of component parts and the number of steps can be reduced.

In addition, the protection device in the third means is arranged within the battery cell, the internal and external electrodes in the aforesaid battery cell are connected to the aforesaid casing and the aforesaid lid member, the aforesaid internal electrode and the aforesaid external electrode are made electrically conductive through the aforesaid electrical conductive passage, thereby an increased gas pressure within the battery cell is accepted as an external pressure, the aforesaid lid member is flexed, the aforesaid electrical conductive passage is broken and then an electrical conductive state between the aforesaid internal electrode and the aforesaid external electrode can be broken.

In addition, the protection device in the fourth means is arranged within the battery cell, each of the aforesaid pair of wiring members is connected to the internal and external electrodes in the aforesaid battery cell, the aforesaid internal electrode and the aforesaid external electrode are made electrically conductive through the aforesaid electrical conductive passage, thereby an increased gas pressure within the battery cell is accepted as an external pressure, the aforesaid lid member is flexed, the aforesaid electrical conductive passage is broken and then an electrical conductive state between the aforesaid internal electrode and the aforesaid external electrode can be broken.

DESCRIPTION OF THE PREFERRED EMBODIMENTS

Figure 1:
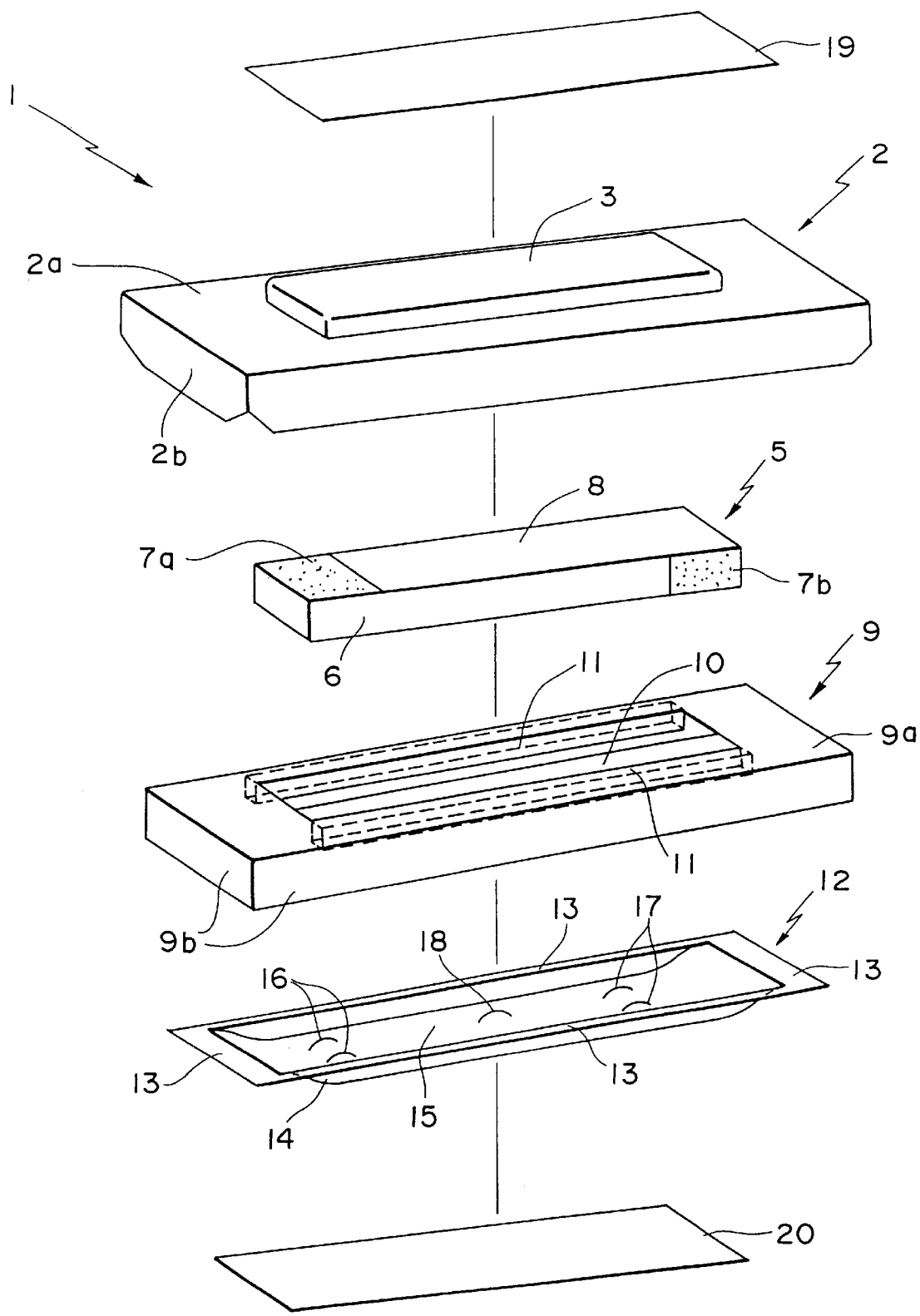
FIG. 1 is a perspective view for showing a protection device of the first preferred embodiment of the present invention.

Referring now to FIGS. 1 to 20, the preferred embodiments of the present invention will be described as follows.

FIGS. 1 to 7 illustrate the protection device of the first preferred embodiment of the present invention. The first preferred embodiment will be described, wherein the protection device 1 is comprised of a casing 2, an electrical conductive passage 5, a holding member 9 and a lid member 12.

The casing 2 made of material such as aluminum, having an electrical conductive characteristic and hollow inner part is comprised of an upper surface 2a and side surface 2b, a central part of the upper surface 2a is provided with a projection part 3 projecting upwardly in a rectangular shape so as to form a concave part 4 inside the casing 2.

Figure 2:
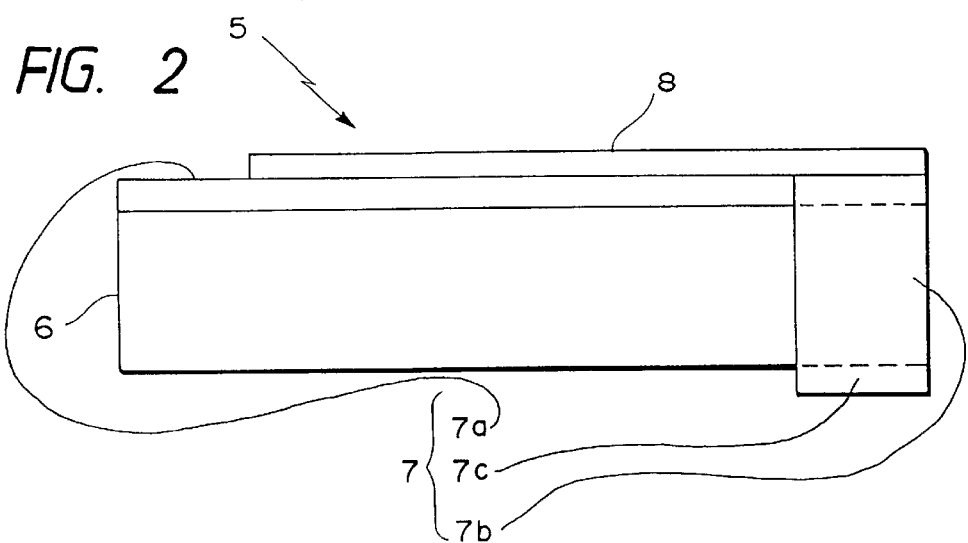
FIG. 2 is an enlarged side elevational view for showing an electrical conductive passage which is a composing element of the protection device of the first preferred embodiment of the present invention.

As shown in FIG. 2, the electrical conductive passage (breakable member) 5 is comprised of a cuboid insulating member 6 made of material such as ceramics, having insulating characteristic and which can be cracked with an external pressure; an electrical conductive part (layer) 7 formed by coating electrical conductive material such as silver on an entire upper surface, a part of the side surfaces and a part of the lower surface of the insulating member 6; and an insulating part (layer) 8 formed by coating the insulating material on the electrical conductive part 7 formed on the upper surface of the insulating member 6 with the pulling-out part (terminal) 77a being left, wherein the electrical conductive part 7 formed on the upper surface of the insulating member 6 is constructed such that the pulling-out part (terminal) 7a and a pulling-out part 7c arranged at a lower surface of the insulating member 6 by a connecting part 7b at an opposite side of the pulling-out part 7a are connected.

This electrical conductive passage 5 is normally set such that the pulling-out parts 7a and 7c are communicated to each other and in the case that the insulating member 6 is cracked with the external pressure, the electrical conductive part 7 formed on the upper surface of the insulating member 6 is broken and the electrical conduction between the pulling-out parts 7a and 7c is broken.

Figure 4:
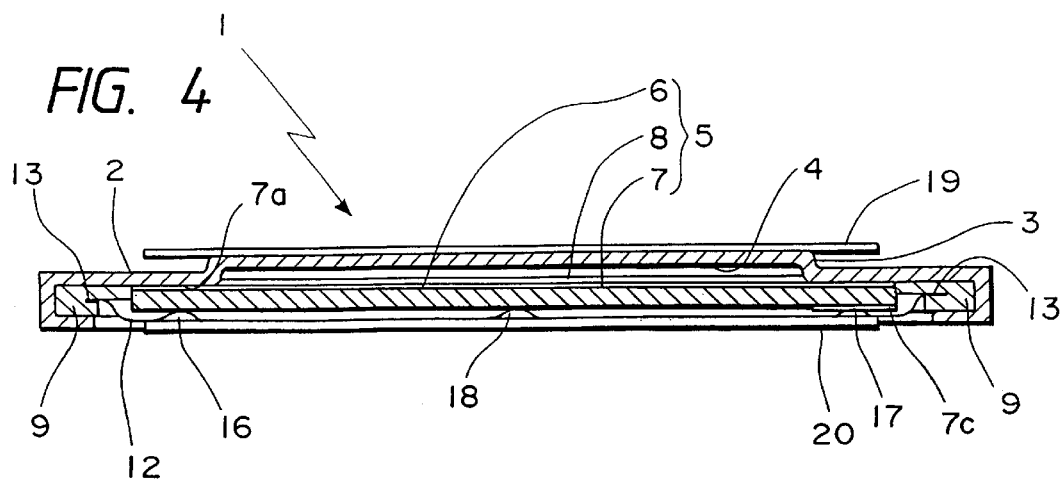
FIG. 4 is a sectional view in a longitudinal direction of the protection device in the first preferred embodiment of the present invention.
Figure 5A:
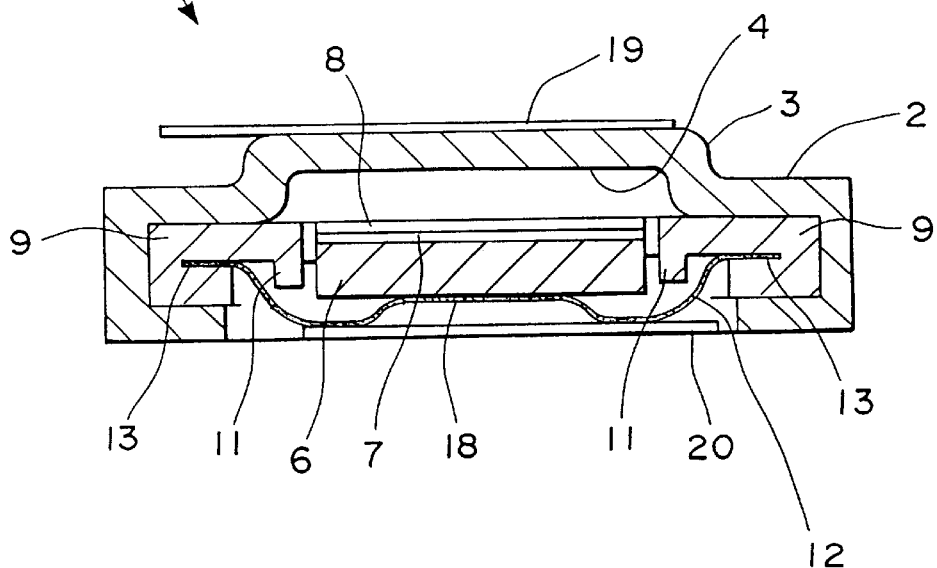
FIGS. 5(A) and 5(B) are sectional views in a width-wise direction of the protection device in the first preferred embodiment of the present invention, wherein 5(A) is a view taken at a central part of the device and 5(B) is a view taken at an end part of the device.
Figure 5B:
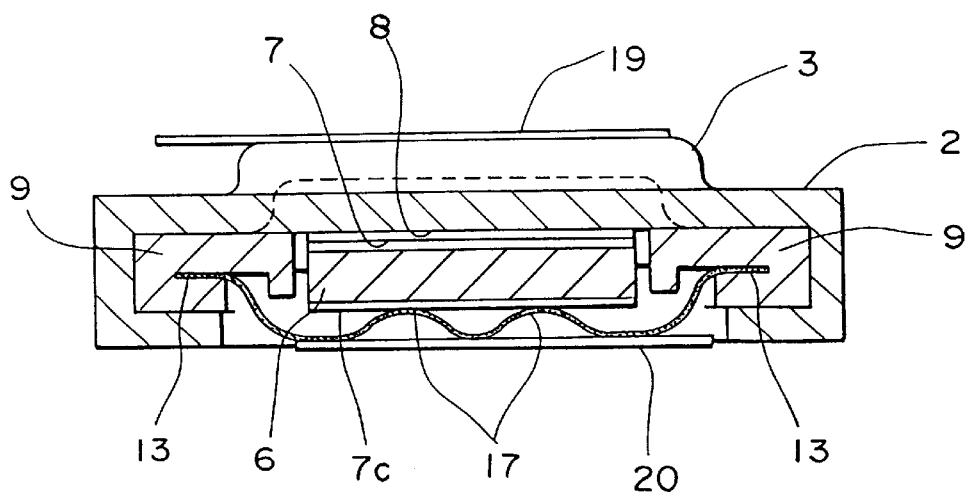

Then, the electrical conductive passage 5 is formed to be longer than a longitudinal size of the concave part 4 of the casing 2 as shown in FIG. 4 and is formed to be shorter in a short direction size of the concave part 4 as shown in FIG. 5. The electrical conductive passage 5 is bridged in a longitudinal direction so as to cover the concave part 4, and stored in the casing 2 while both ends of the upper surface, i.e. the pulling-out part 7a and the insulating part 8 are abutted against the inner wall of the upper surface 2a of the casing 2. In addition, when stored, the electrical conductive passage 5 is positioned over the concave part 4 in a short direction as shown in FIG. 5, both ends of the electrical conductive passage are provided with clearances and can be immersed into the concave part 4. The depth of the concave part 4 is set to such a size as one in which the electrical conductive passage 5 can be cracked.

Figure 3:
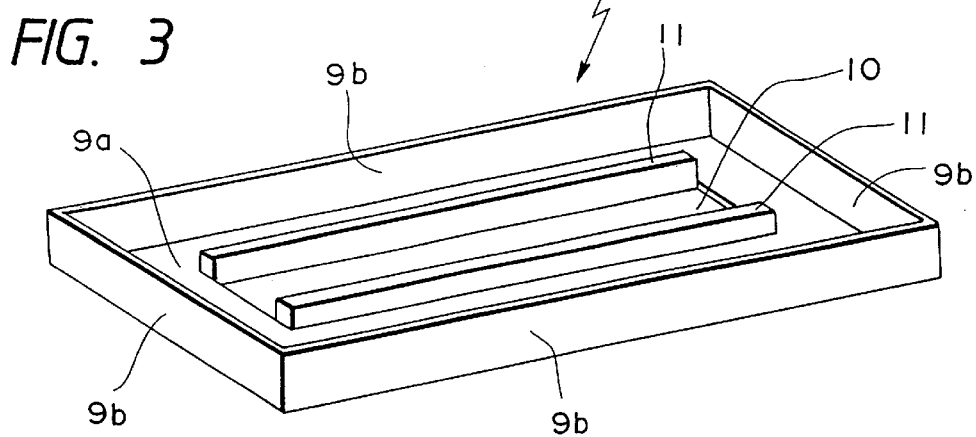
FIG. 3 is an enlarged perspective view as viewed from a rear surface of a holding member which is a composing element of the protection device in the first preferred embodiment of the present invention.

A casing-like holding member 9 made of rubber material, having an insulating characteristic and a hollow inside part is comprised of an upper surface 9a and side surfaces 9b, wherein as shown in FIG. 3, the upper surface 9a is provided with an opening 10 which is slightly larger than an outer shape of the electrical conductive passage 5, and the inner wall of the upper surface 9a is provided with ridges 11 along both edges in a longitudinal direction of the opening 10.

This holding member 9 is stored in an inner hollow part formed by the upper surface 2a and the side surfaces 2b of the casing 2, each of the outer walls of the upper surface 9a and the side surfaces 9b is abutted against the inner walls of the upper surface 2a and the side surfaces 2b of the casing 2. In addition, when the holding member 9 is stored in the inner hollow part of the casing 2, the electrical conductive passage 5 is positioned at its opening 10, and movements of the electrical conductive passage 5 in both longitudinal and width-wise directions as well as vertical direction are restricted by the opening 10 and the ridges 11 in such a way that the electrical conductive passage 5 and the casing are contacted to each other at the predetermined position.

The lid member 12 made of material such as aluminum which can be flexed and have an electrical conductive characteristic is provided with a concave part 14 projecting downwardly at its entire circumference so as to form a ship-like shape with its edges 13 being left, a bottom surface 15 of the concave part 14 can be flexed upwardly while receiving an external pressure. Each of both ends of the bottom surface 15 is formed with a pair of spaced-apart projections 16 and 17 projecting upwardly in a short direction and the central part of the bottom surface 15 is formed with one projection 18 projecting upwardly.

This lid member 12 is stored in the holding member 9 in such a way that the edges 13 are abutted against the inner wall of the upper surface 9a of the holding member 9, the projections 16 and 18 are respectively abutted against one end of and the central part of the electrical conductive passage 5 and the projections 17 are abutted against the pulling-out part 7c at the lower surface of the electrical conductive passage 5. Then, this lid member 12 is supported while the edges 13 are closely contacted and held by the inward bent side surfaces 9b and the upper surface 9a of the holding member 9.

In addition, the holding member 9 is fixed in such a way that its side surfaces 9b are bent by the inward bent side surfaces 2b of the casing 2, the outer wall of the upper surface 9a is abutted against the upper surface of the casing 2 and the holding member 9 is held by the upper surface 2a and the side surfaces 2b. As a result, each of the upper surfaces 9a and the side surfaces 9b is closely contacted without any clearance against the inner walls of the upper surface 2a and the side surfaces 2b of the casing 2 under a resiliency of the holding member 9 by itself, thereby an inside part enclosed by the casing 2, the holding member 9 and the lid member 12 is sealingly closed and the electrical conductive passage 5 is positioned inside it.

As a result, the upper surface of the electrical conductive passage 5 is pressed toward the concave part 4 of the casing 2 with the projections 16, 17 and 18 of the lid member 12, its pulling-out part 7a is always contacted with the inner wall of the upper surface 2a of the casing 2, the pulling-out part 7c is always contacted with the projections 17 of the lid member 12, and the casing 2 and the lid member 12 are electrically conductive through the electrical conductive passage 5.

In addition, the protection device 1 is provided with rectangular electrical conductive foils 19, 20 acting as the external pulling-out terminals of the electrical conductive passage 5. As shown in FIGS. 4 and 5, the electrical conductive foil 19 is projected symmetrically around the central part of the projection part 3 in a longitudinal direction at the outer wall of the projection 3 of the casing 2, the foil is projected from one end of the projection 3 in the width-wise direction, positioned not to be projected out of the other end and fixed by an ultrasonic wave melting and fixing. At the outer wall of the concave part 14 of the lid member 12, the electrical conductive foil 20 is positioned in the same manner as that above in such a way that it may be symmetrical around the central part of the concave part 14 in a longitudinal direction and in such a way that it may be projected from one end where the electrical conductive foil 19 of the projection 3 is projected in a width-wise direction, it may not be projected out of the other end and then the foil is fixed by an ultrasonic wave melting and fixing process.

The electrical conductive foils 19 and 20 are electrically conductive, an electrical current can pass from the electrical conductive foil 19 to the casing 2 and flow to the electrical conductive passage 5, further the current can pass from the electrical conductive passage 5 to the lid member 12 and flow to the electrical conductive foil 20, and vice versa.

Then, an assembling method for the protection device 1 will be described, wherein at first, the holding member 9 is stored within the inner hollow part of the casing 2, each of the upper surface 9a and the side surfaces 9b is abutted against the upper surface 2a and the side surfaces 2b of the casing 2, the electrical conductive passage 5 is inserted into the opening 11 of the holding member 9, the pulling-out part 7a of the electrical conductive part 7 formed on the upper surface of the electrical conductive passage 5 and the insulating part 8 are mounted on the upper surface 2a of the casing 2.

Then, when the lid member 12 is fed into the inner hollow part of the holding member 9 and the edges 13 are abutted against the upper surface 9a of the holding member 9 in such a way that the four corners of the edges 13 are coincided with the four corners of the inner wall of the upper surface 9a of the holding member 9, each of the projections 16, 18 is abutted against one end of and the central part of the lower surface of the electrical conductive passage 5 and the projections 17 are abutted against the pulling-out part 7c of the lower surface of the electrical conductive passage 5.

Thereafter, then the side surfaces 2b of the casing 2 are bent inwardly, the side surfaces 9b of the holding member 9 are also pushed by the side surfaces 2b and bent in such a way that the edges 13 of the lid member 12 are held by the upper surface 9a of the holding member 9. Then, when the side surfaces 2b of the casing 2 are bent inwardly, the holding member 9 holds and supports the edges 13 of the lid member 12 with the bent side surfaces 9b and the upper surface 9a and at the same time, it is held by the bent side surfaces 2b of the casing 2 and its upper surface 2a, i.e. it is press fitted and fixed.

Lastly, the rectangular electrical conductive foil 19 is positioned in such a way that it may become symmetrical around the central part of the projection 3 of the casing 2 in a longitudinal direction and in such a way that it is projected out of one end of the projection 3 in a short direction and not projected out of the other end, but fixed to the outer wall of the projection 3 with an ultrasonic wave welding and fixing. The rectangular electrical conductive foil 20 is positioned in the same manner as that described above in such a way that it may become symmetrical around the center of the concave part 14 of the lid member 12 in a longitudinal direction and in such a way that the electrical conductive foil 19 of the projection part 3 of the casing 2 is projected out of one end opposite to the projected end in a width-wise direction, but not projected out of the other end, thereby it is fixed to the outer wall of the concave part 14 of the lid member 12 with an ultrasonic wave welding and fixing.

In this way, assembling of the protection device 1 is completed, and after assembling operation, the inside part of the protection device 1 is set such that the upper surface 9a and the side surfaces 9b are closely contacted with the edges 13 of the lid member 12 by resiliency of the holding member 9 by itself and closely contacted without any clearance to the inner walls of the upper surface 2a and the side surfaces 2b of the casing 2, thereby an inside part enclosed by the casing 2, the holding member 9 and the lid member 2 is sealingly closed.

Figure 6:
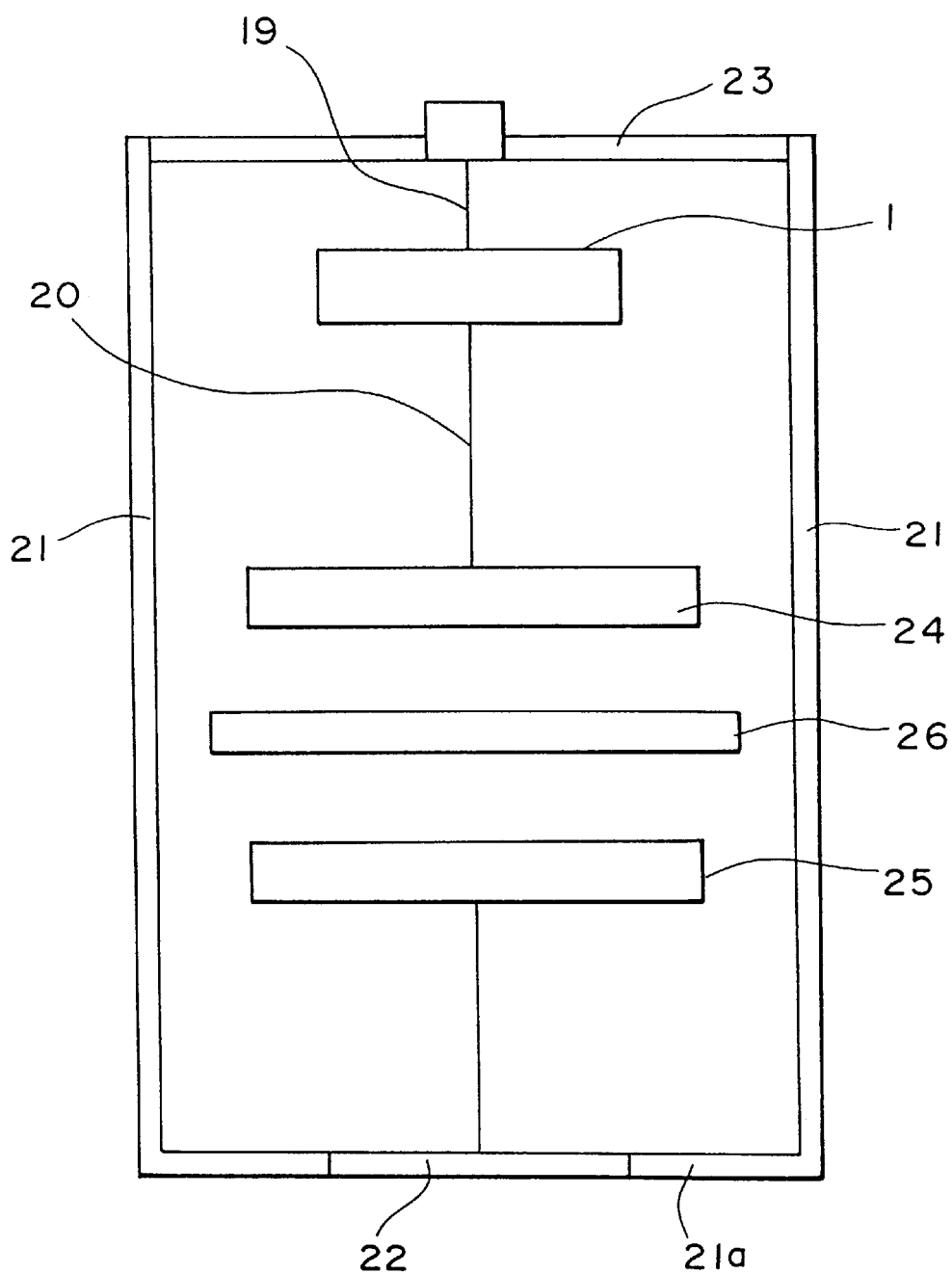
FIG. 6 is a schematic sectional view for showing a battery cell to which the protection device of the first preferred embodiment of the present invention is fixed.

The protection device 1 assembled in this way is assembled within the battery cell such as lithium ion secondary battery cell or nickel-hydrogen secondary battery cell or the like. FIG. 6 illustrates a schematic state of the battery cell as an example of lithium ion secondary battery cell, wherein a hollow cylinder 21 having a bottom part with its upper end being opened has an opening at its bottom surface 21a, its opening is sealingly closed by an electrical conductive negative electrode can 22 made of stainless steel. An electrical positive electrode lid 23 made of stainless steel is an external electrode so as to sealingly close the upper end of the cylinder 21, thereby an inside part of the cylinder 21 is sealingly closed.

Then, within the cylinder 21 are assembled the positive electrode 24 made of lithium oxide cobalt acting as an internal electrode, a negative electrode 25 made of carbon, a separator 26 for preventing a short circuit between the positive electrode 24 and the negative electrode 25, and the protection device 1. The protection device 1 is connected to the positive electrode lid 23 through the electrical conductive foil 19 and further connected to the positive electrode 24 through the electrical conductive foil 20. In addition, the negative electrode 25 is arranged to oppositely face against the positive electrode 24 with the separator 26 being held thereat and then connected to the negative electrode can 22. In addition, the inner part of the cylinder 21 is filled with electrolyte.

When a specified current flows between the positive electrode lid 23 and the negative electrode can 22 of the lithium ion secondary battery cell constructed as described above, a chemical reaction occurs between the positive electrode 24 and the negative electrode 25 so as to perform a charging operation.

During the charging operation, an electrical current in the protection device 1 flows from the positive electrode lid 23 to the electrical conductive foil 19, the casing 2, the electrical conductive passage 5, the lid member 12 and the electrical conductive foil 20, in sequence, and fed out to the positive electrode 24. That is, the electrical current flows to the casing 2 which is integral with the electrical conductive foil 19, passes from the pulling-out part 7a of the electrical conductive passage 5 abutting against the inner wall of the upper surface 2a of the casing 2 to the connection part 7b, is fed out to the pulling-out part 7c at the lower surface of the electrical conductive passage 5, is fed out to the pulling-out part 7c and the lid member 12 abutted against the projections 17 and further the electrical current is fed out of the lid member 12 to the positive electrode 24 through the electrical conductive foil 20.

At this time, when the electrical current continues to flow even after completion of the charging operation and an excessive charging is carried out or when the charging is carried out with an electrical current larger than the specified current, an abnormal state occurs in the batter cell to cause either a pressure or a temperature within the battery cell to be increased.

Figure 7:
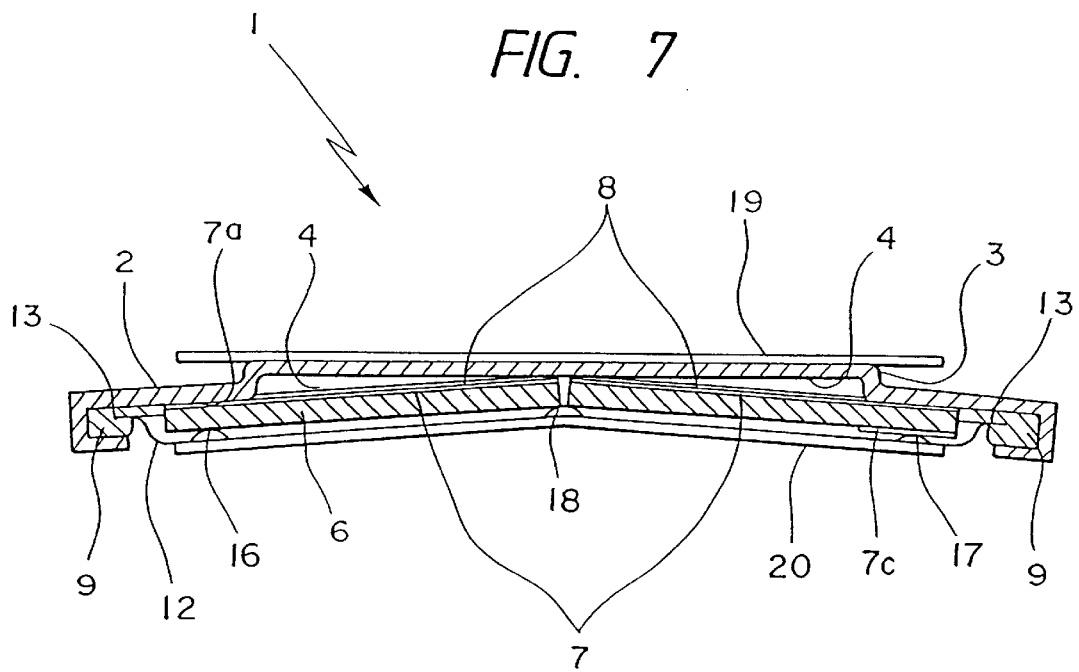
FIG. 7 is a sectional view for showing a state in which the electrical conductive passage in the protection device of the first preferred embodiment of the present invention is broken.

As the pressure within the battery cell is increased, it is transmitted to the protection device 1 as an external pressure. Then, as shown in FIG. 7, this external pressure flexes the bottom surface 15 of the lid member 12 in an inward direction, deforms it and the projection 18 formed at the bottom surface 15 of the lid member 12 pushes the electrical conductive passage 5 in an upward direction. The electrical conductive passage 5 of which movement in a longitudinal or short direction and a vertical direction is pushed into the concave part 4 of the casing 2 with the projection 18 of the lid member 12 and deforms when a pressure within the battery cell is increased and its pressure reaches a specified pressure, the lid member 12 receives this pressure. At this time, the electrical conductive part 7 constituting the electrical conductive passage 5 is broken, an electrical conduction between the pulling-out parts 7a and 7c is cut off, thereby the protection device 1 breaks an electrical current flowing between the positive electrode lid 23 and the positive electrode 24 so as to terminate a further charging and at the same time, the lithium ion secondary battery cell may not be acted as the battery cell. In this case, as shown in FIG. 7, since the insulating part 8 on the upper surface of the cracked electrical conductive passage 5 is kept abutted against the concave part 4 of the casing 2, the electrical conduction of the broken electrical conductive part 7 is cut, and the broken electrical conductive part 7 is not electrically connected by the concave part 4. Accordingly, in the present invention, pressure generated within the battery cell is uniformly applied at any location within the battery cell, resulting in that the protection device 1 can be installed at any location within the battery cell, and further it is possible to improve a degree of freedom in designing the battery cell in view of arranging a safety mechanism in it. In addition, the protection device 1 enables its function acting as a battery cell showing an abnormal state to be positively prohibited, resulting in that when the battery cell having the abnormal state is assembled in equipment, it is possible to prevent corrosion of equipment caused by extrusion of electrolyte under cracks or breakage of the battery cell.

In the aforesaid preferred embodiment of the present invention, the lid member 12 has a flexing characteristic, although the casing 2 may have a flexing characteristic.

Figure 8:
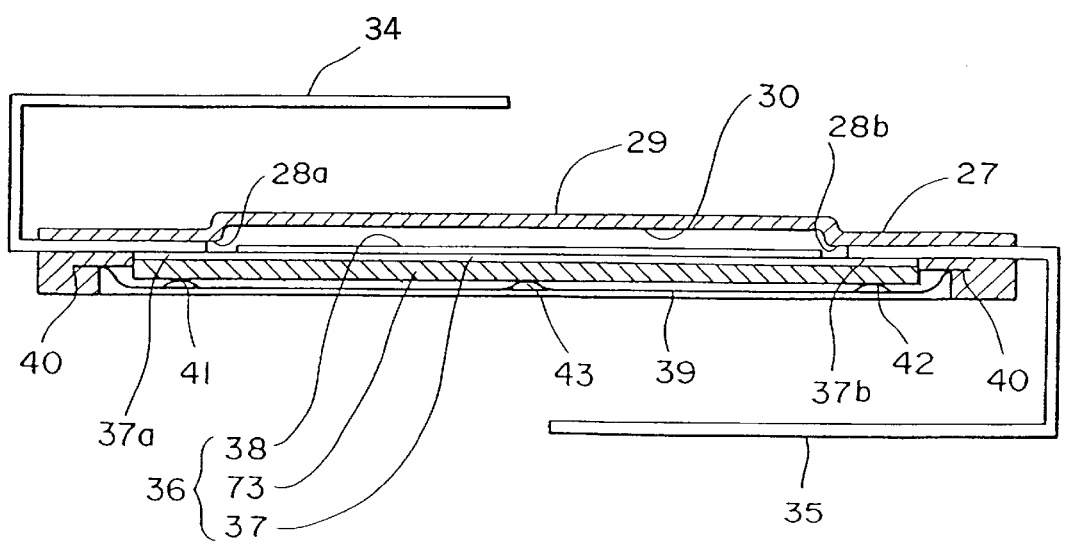
FIG. 8 is a sectional view taken in a longitudinal direction of the protection device in the second preferred embodiment of the present invention.
Figure 9:
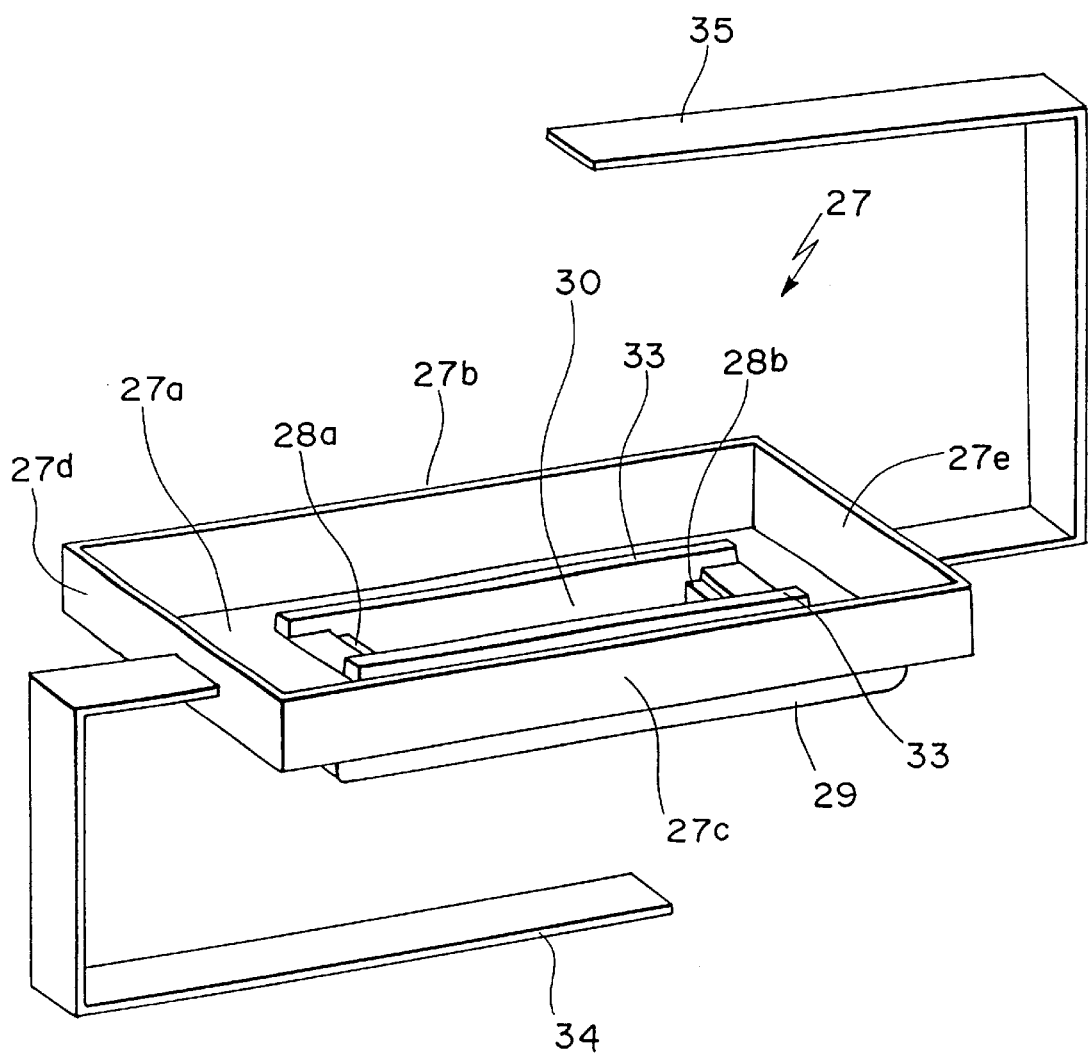
FIG. 9 is an enlarged perspective view as viewed from a rear surface of a casing which is an composing element of the protection device in the second preferred embodiment of the present invention.

The protection device shown as the second preferred embodiment in FIGS. 8 and 9 is comprised of a casing 27, wiring members 34, 35, an electrical conductive passage 36 and a lid member 39.

A casing 27 having a hollow inner side made of insulating material such as polybutylene terephthalate is comprised of an upper surface 27a, longitudinal side surfaces 27b and 27c and short side surfaces 27d, 27e and as shown in FIG. 9, this casing is constructed to have an integral assembly of the casing 2 and the holding member 9, and it is formed by molding operation. The upper surface 27a is provided with rectangular dimples 28a, 28b which are formed to be symmetrical in a longitudinal direction in respect to the central part of it. A projection 29 projecting upwardly in a rectangular form is arranged between the receiving portions 28a and 28b, thereby a concave part 30 for connecting the receiving portions 28a and 28b is arranged within the casing 27. In addition, the inner wall of the upper surface 27a is provided with projections 33 extending along both edges in a longitudinal direction of the concave part 30.

Wiring members 34, 35 which can be bent and have an electrical conduction characteristic have a rectangular shape. Then, as shown in FIG. 9, the wiring members 34, 35 are integrally arranged under formation with the casing 27, one end of each of the wiring members is fed out of the receiving parts 28a, 29a of the casing 27 and positioned at the concave part 30 without being extruded.

An electrical conducting passage (breakable member) 36 is comprised of an insulating member 73 having the same constitution as that of the insulating member 6 shown in the first preferred embodiment, an electrical conducting part 37 formed to be coated with electrical conductive material such as silver on the entire surface of the insulating member 73, and an insulating part 38 formed to be coated with insulating material with the pulling-out parts (terminals) 37a, 37b being left on the electrical conducting part 37, wherein the electrical conducting passage 36 is made such that the pulling-out parts 37a, 37b are electrically conductive, although when the insulating member 73 is cracked with the external pressure, the electrical conductive part 37 formed on the insulating member 73 is broken, the electrical conduction between the pulling-out parts 37a, 37b is broken. The electrical conductive passage 36 is bridged in a longitudinal direction so as to extend across the concave part 30 of the casing 27, each of the pulling-out parts 37a, 37b is abutted against one end of each of the wiring members 34, 35 and stored in the groove 28 of the casing 27, then, the wiring members 34, 35 are electrically conductive through the electrical conductive passage 36. Further, when stored, it is positioned above the concave part 30 in a short direction and both ends are provided with clearances and at the same time it can be immersed in the concave part 30. Then, a depth of the concave part 30 is set to have a size enabling the electrical conductive passage 36 to be cracked in it. In this case, movements of the electrical conductive passage 36 in its longitudinal and short directions as well as its vertical direction are restricted by the receiving portions 28a, 28b and the projections 33 in such a way that it may be contacted with one end of each of the wiring members 34, 35 at a predetermined position.

The flexible lid member 39 having an insulating characteristic has the same structure as that of the lid member 12 shown in the first preferred embodiment. The lid member 39 is abutted at its edge 40 against the inner wall of the upper surface 27a of the casing 27, its projections 41, 42, 43 are abutted against the lower surface of the electrical conductive passage 36 and stored in the inner hollow part of the casing 27. Then, the lid member 39 is held and fixed while being closely contacted at the edges 40 with the inward bent longitudinal side surfaces 27b, 27c and short side surfaces 27d, 27e and the upper surface 27a. With such an arrangement as above, an inner part enclosed bt the casing 27 and the lid member 39 is sealingly closed and then the electrical conductive passage is positioned in it.

Although not shown in the drawing, this protection device is also constructed such that as shown in FIG. 6, the wiring members 34, 35 are connected to the positive electrode lid 23 and the positive electrode 24 and assembled in the lithium ion secondary battery cell, wherein in the case that an over-charging is carried out or when a charging is carried out with an electrical current larger than the specified current, the lid member 39 is flexed inwardly due to an increased pressure within the lithium ion secondary battery cell and then the electrical conductive passage 36 is broken to cause an electrical current flowing between the positive electrode lid 23 and the positive electrode 24 to be cut off. Accordingly, also in the second preferred embodiment, it is possible to terminate the over-charging and to prevent the lithium ion secondary battery cell from being operated as a battery cell and further it is possible to prohibit bad influence caused by extrusion of electrolyte under expansion or crack of the battery cell for the equipment to which the lithium ion secondary battery cell is assembled. In this preferred embodiment, since the lid member 27 is constructed such that the lid member 2 shown in the first preferred embodiment and the holding member 9 are integrally assembled, the number of component parts, the number of assembling steps and a product cost can be decreased as compared with those of the first preferred embodiment.

Also in the second preferred embodiment, the lid member 39 is of a flexible one, although it may be applicable that the casing 27 has a flexibility.

Figure 10:
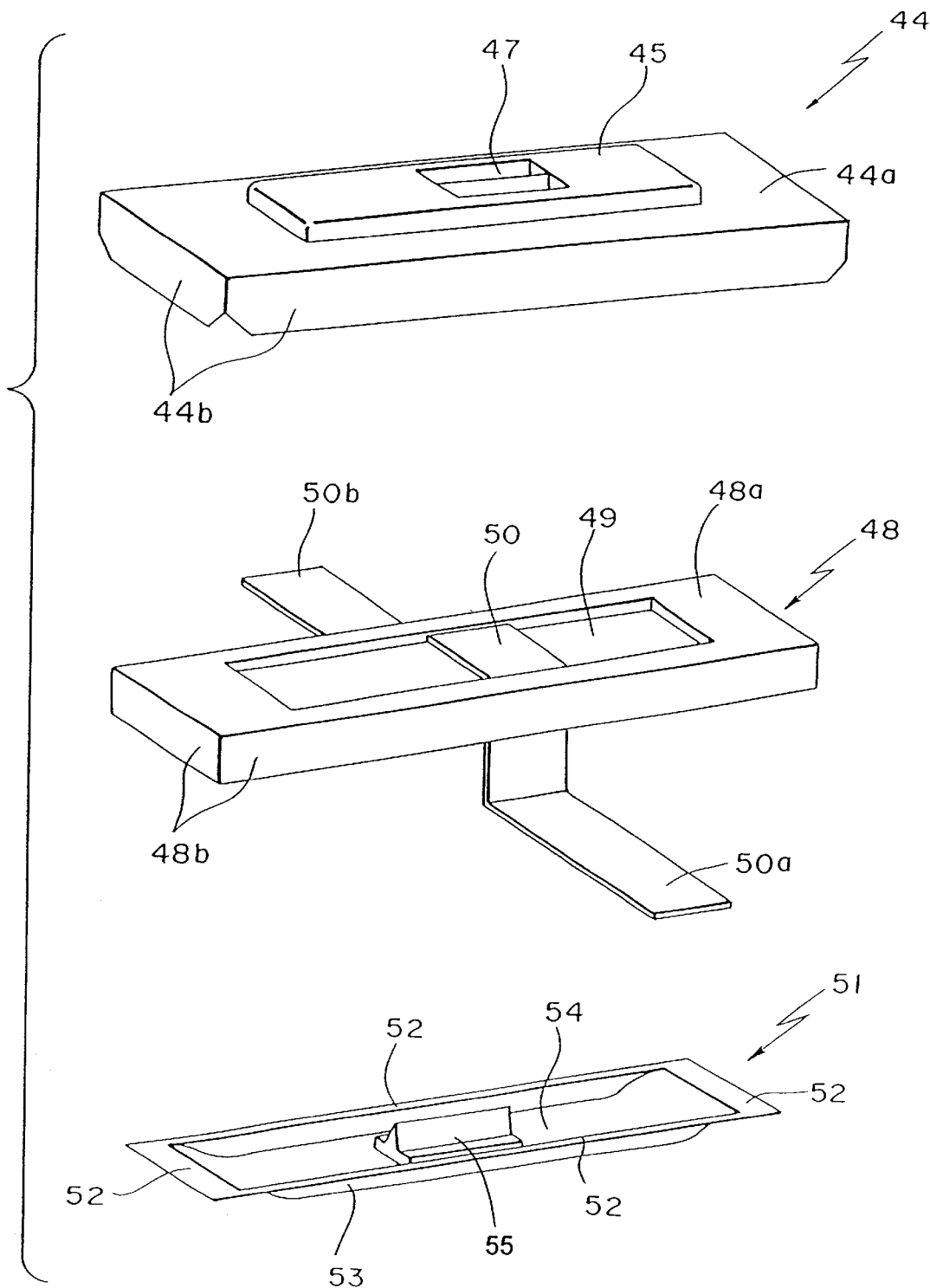
FIG. 10 is a perspective view for showing the protection device of the third preferred embodiment of the present invention.
Figure 11:
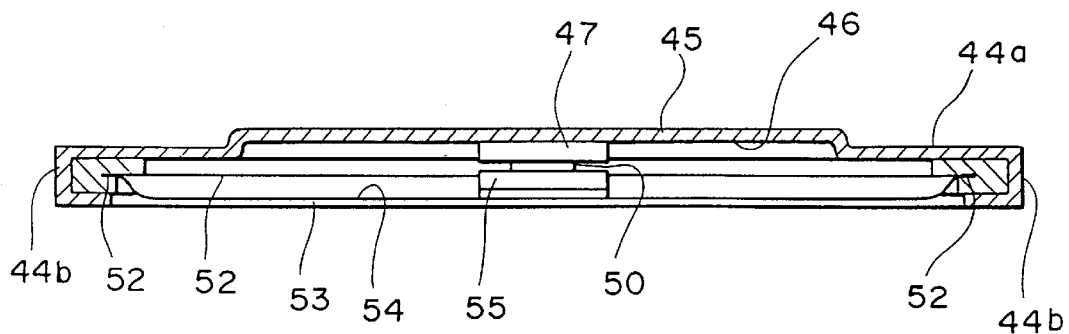
FIG. 11 is a sectional view taken in a longitudinal direction of the protection device of the third preferred embodiment of the present invention.
Figure 12:
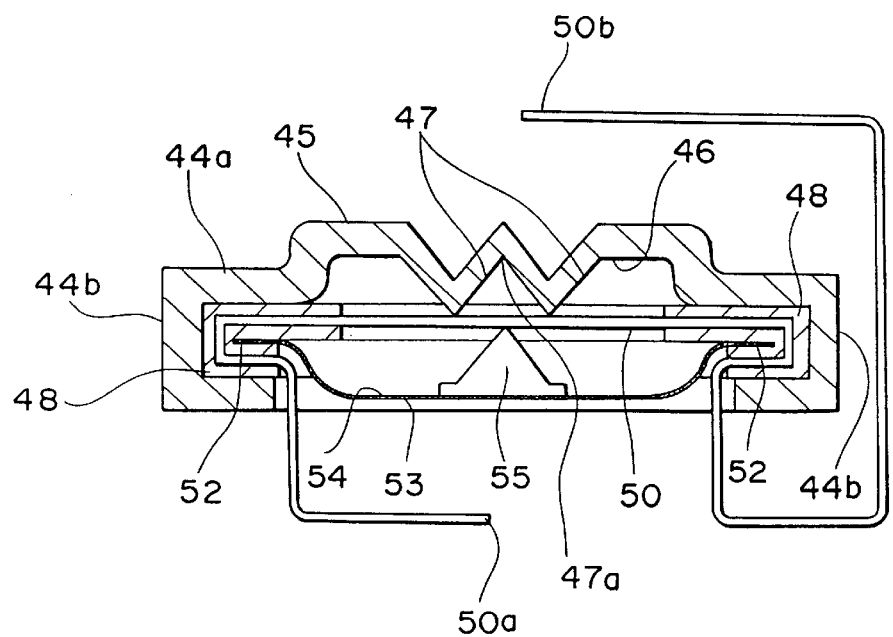
FIG. 12 is a sectional view taken at a central part in a width-wise direction of the protection device in the third preferred embodiment of the present invention.

The protection device shown in FIGS. 10 to 12 as the third preferred embodiment is comprised of a casing 44, a holding member 48, an electrical conductive wiring 50 and a lid member 51.

A casing 44 with an inner hollow part made of insulating material is comprised of an upper surface 44a and side surfaces 44b, has the same constitution as that of the casing 2 disclosed in the first preferred embodiment, a central part of the upper surface 44a is provided with a projection 45 projected upwardly in a rectangular form, thereby a concave part 46 is arranged within the casing 44. Then, as shown in FIG. 11, the projection 45 is provided with a projection 47 projected into the casing 44 with a certain width in a longitudinal direction and as shown in FIG. 12, having a saw-tooth like section in a width-wise direction.

A casing-like holding member 48 with inner hollow part made of rubber material is comprised of an upper surface 48a and side surfaces 48b, has a constitution in which the projection 11 in the holding member 9 shown in the first preferred embodiment is eliminated, and its upper surface 48a is provided with an opening 49.

An electrical conductive wiring 50 comprised of a rectangular metallic foil which can be broken is arranged to oppositely face against the projection 47 of the casing 44. As shown in FIG. 10, the electrical conductive wiring 50 is integrally formed with the holding member 48 through molding, bridged over the opening 49 of the holding member 48 in a short direction and at the same time both ends of the opening 49 are provided with clearances. In addition, both ends 50a, 50b of the electrical conductive wiring 50 in a longitudinal direction are fed out of the lower ends of the side surfaces 48b of the holding member 48, and both ends 50a and 50b are electrically conductive.

This holding member 48 is constructed such that each of the outer walls of the upper surface 48a and the side surfaces 48b is abutted against the inner walls of the upper surface 44a and the side surfaces 44b of the casing 44, respectively, and the holding member is stored in an inner hollow part constituted by the upper surface 44a and the side surfaces 44b of the casing 44. In addition, in the case that the holding member is stored in the inner hollow part of the casing 44, the electrical conductive wiring 50 is abutted and positioned against the part just below the projection 47 as shown in FIGS. 11 and 12 and can be immersed into the concave part 46.

The lid member 51 which can be flexed and has a insulating characteristic has a constitution in which projections 16, 17, 18 in the lid member 12 in the first preferred embodiment are removed, a concave part 53 projecting downwardly is arranged with edges 52 being left over an entire circumference of it, formed into a ship-like shape, a bottom surface 54 of the concave part 53 can be flexed upwardly with the external pressure being applied thereto and a broken-away projection 55 projecting upwardly is fixed to the central part of the bottom surface 54 with adhesive agent or the like. As shown in FIG. 11, the broken-away projection 55 is made such that its width in a longitudinal direction is equal to a width of the projection 47 of the casing 44 in a longitudinal direction, and as shown in FIG. 12, it is formed to be engaged with a valley 47a of the projection 47 of the casing 44. Then, this lid member 51 is stored in the inner hollow part of the holding member 48 with its edges 52 being abutted against the inner walls of the upper surface 48a of the holding member 48. When it is stored, the broke-away projection 55 is positioned to face against the valley 47a of the projection 47 of the casing 44, its extremity end is contacted with the electrical conductive wiring 50 and when the bottom surface 54 is flexed upwardly with the external pressure, the broken-away projection 55 is engaged with the valley 47a of the projection 47 of the casing 44 to break the electrical conductive wiring 50 so as to cut off the electrical conduction between both ends 50a and 50b.

This lid member 51 is supported such that its edges 52 are held under their close contacted state by the side surfaces 48b of the holding member 48 bent inwardly and by its upper surface 48a.

In addition, the holding member 48 is fixed such that its side surfaces 48b are bent with the inward bent side surfaces 44a of the casing 44, the outer wall of the upper surface 48a is abutted against the upper surface 44a of the casing 44, and the holding member 48 is held by the upper surface 44a and the side surfaces 44b. As a result, each of the upper surface 48a and the side surfaces 48b is closely contacted without any clearance to the inner walls of the upper surface 44a and the side surfaces 44b of the casing 44 with a resiliency of the holding member 48 by itself, thereby an inner part enclosed by the casing 44, the holding member 48 and the lid member 51 is sealingly closed.

Also not illustrated in this case, the protection device is constructed such that as shown in FIG. 6, each of both ends 50a, 50b of the electrical conductive wiring 50 is connected to the positive electrode 24 and a positive electrode lid 23 within the battery cell and mounted in the same manner as that of the first preferred embodiment, wherein the lid member 51 is flexed inwardly due to an increased pressure within the battery cell, the broken-away projection 55 fixed to the lid member 51 is engaged with the valley 47a of the projection 47 of the casing 44, thereby the electrical conductive wiring 50 is broken to cut off an electrical current flowing between the positive electrode lid 23 and the positive electrode 24.

In the third preferred embodiment of the present invention, the electrical conductive passage 5 and the electrical conductive foils 19, 20 in the first preferred embodiment can be eliminated, the number of component parts can be reduced and at the same time a step for forming the electrical conductive passage 50 and another step for welding and fixing each of the electrical conductive foils 19, 20 to the casing 2 and the lid member 12 can be eliminated.

In addition, although the third preferred embodiment is constructed to have a flexing lid member 51, it may also be applicable that the casing 44 has a flexibility characteristic.

The protection device shown in FIGS. 13 to 16 as the fourth preferred embodiment is comprised of a casing 56, an electrical conductive passage 36, a holding member 59, wiring members 64, 65 and a lid member 66.

The casing 56 having an inner hollow part made of material such as stainless steel is comprised of an upper surface 56a and side surfaces 56b, it has the same constitution as that of the casing 2 illustrated in the first preferred embodiment, a central part of the upper surface 56a is provided with a projection 57 projecting in a rectangular form so as to cause the inner side of the casing 56 to be provided with concave part 58.

Figure 13:
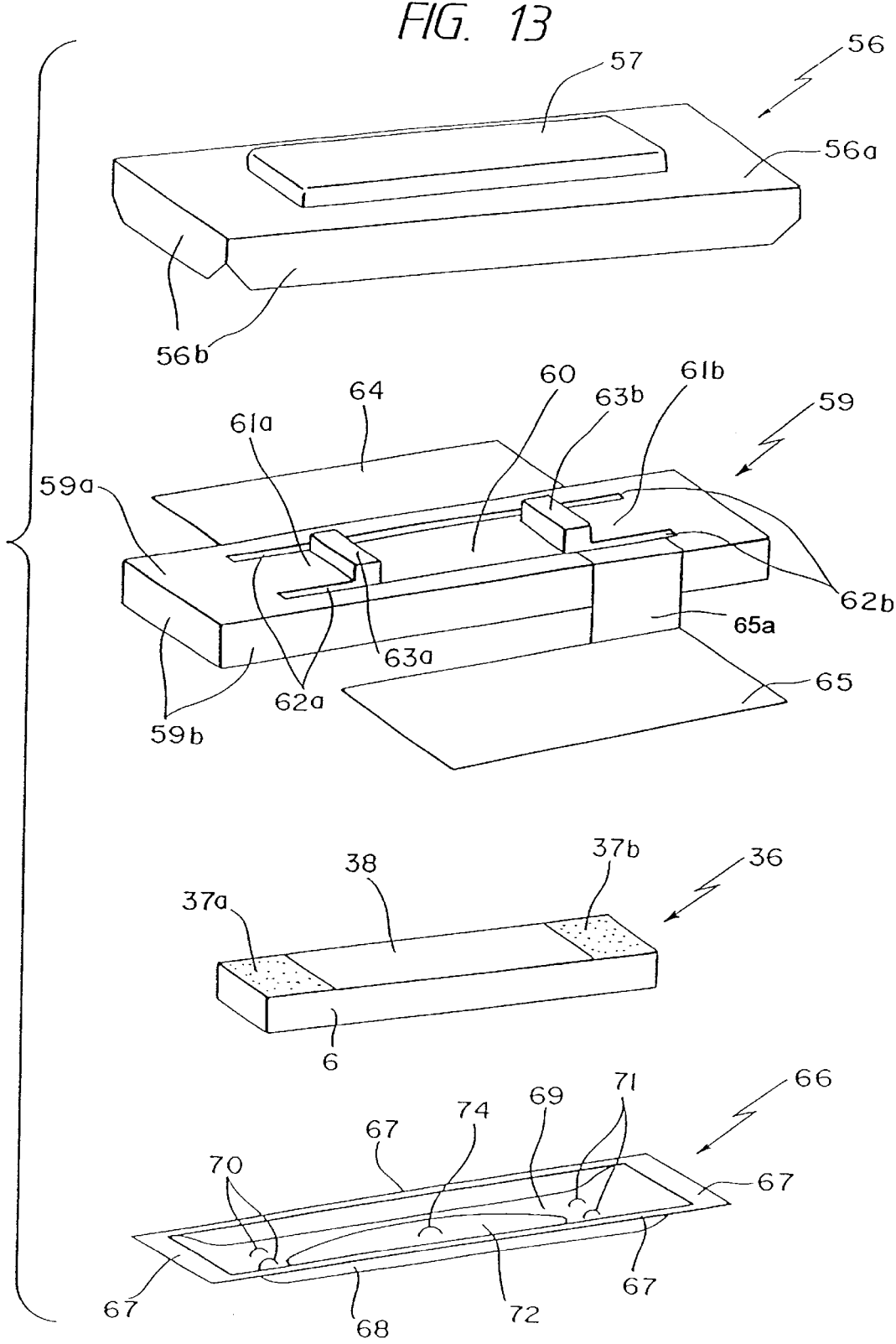
FIG. 13 is a perspective view for showing the protection device in the fourth preferred embodiment of the present invention.
Figure 14:
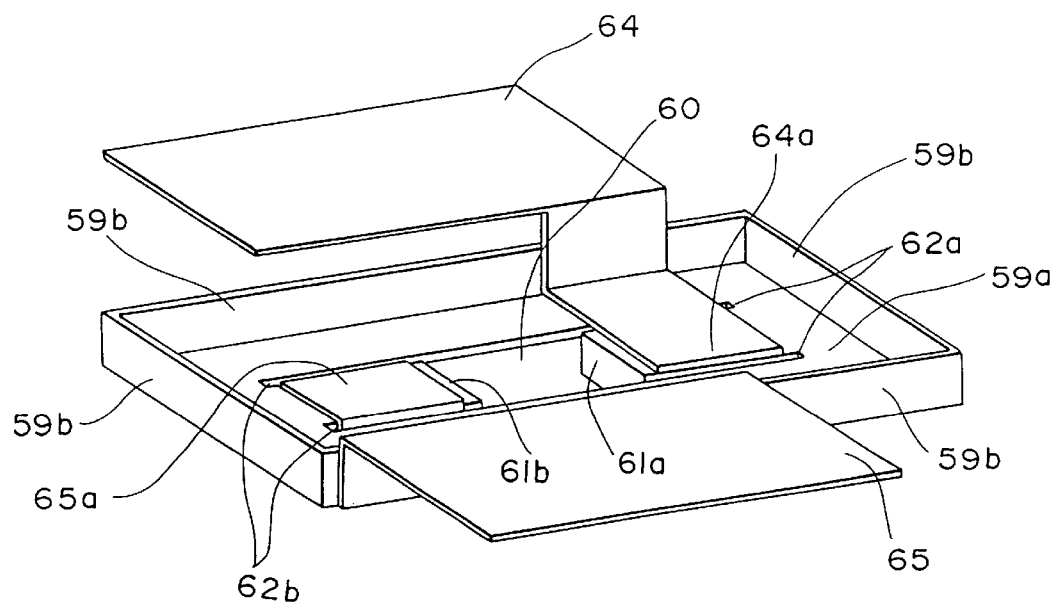
FIG. 14 is an enlarged perspective view as viewed from a rear surface of the holding member of the composing element of the protection device in the fourth preferred embodiment of the present invention.
Figure 15:
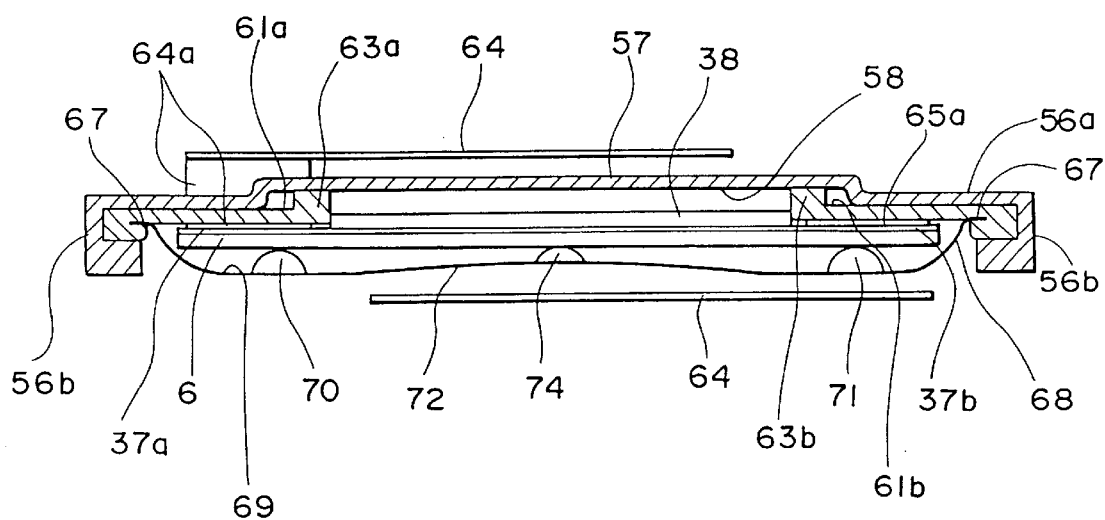
FIG. 15 is a sectional view taken in a longitudinal direction of the protection device in the fourth preferred embodiment of the present invention.

A casing-like insulating holding member 59 with an inner hollow part made of rubber material is comprised of an upper surface 59a and side surfaces 59b, and as shown in FIGS. 13 and 14, the upper surface 59a is provided with an opening 60, the extending portions 61a and 61b extending from both edges of the opening 60 in a short direction into the opening 60 are arranged with clearances 62a, 62b being spaced apart without being contacted with both edges in a longitudinal direction of the opening 60, and further each of the extending ends of the extending portions 61a, 61b is integrally formed with the cuboid projections 63a, 63b, respectively.

Wiring members 64, 65 having electrical conducting characteristic which can be bent have a rectangular shape, and the lead portions 64a, 65a extending from one side end in a rectangular form are integrally formed. As shown in FIG. 14, the lead part 64a of the wiring member 64 is bent, abutted against the inner walls of the side surfaces 59b, the upper surface 59a of the holding member 59 and the extending part 61a and positioned within the inner hollow part of the holding member 59. The lead part 65a of the wiring member 65 is fed out from the clearance 62b of the holding member 59 into the inner hollow part of the holding member 59, bent to cause its extremity end to be abutted against that inner wall of the extending part 61b and at the same time it is bent along the outer walls of the upper surface 59a and the side surfaces 59b.

Then, this holding member 59 is stored in the inner hollow part of the casing 56, each of the outer walls of the upper surface 59a and the side surfaces 59b is abutted against the inner walls of the upper surface 56a and the side surfaces 56b, the projections 63a, 63b of the extending portions 61a, 61b are positioned within the concave part 58 of the casing 56 and the abutted against the inner wall.

The electrical conducting passage 36 is set such that each of the pulling-out parts 37a, 37b is abutted against the lead parts 64a, 65a of the wiring members 64, 65, positioned on the opening 60 of the holding member 59 and stored within the inner hollow part. As a result, the wiring members 64, 65 are electrically conductive through the electrical conducting passage 36. Then, when the electrical conducting passage is pushed upwardly with the external pressure, its both ends are supported by the extending portions 61a, 61b and split at its central part.

A flexible lid member 66 is formed into a ship-like shape by arranging a downward projecting concave part 68 with the edge 67 being left at its entire circumference, the bottom surface 69 of the concave part 68 can be flexed upwardly under an application of the external pressure. Each of both ends of the bottom surface 69 is formed with a pair of projections 70, 71 which are spaced apart to be projected upwardly in a short direction, a projection 72 projecting upwardly in an ellipse shape is formed at the central part of the bottom surface 69 and at the same time a projection 74 projecting upwardly is arranged at the central part.

Accordingly, since the bottom surface 68 is flexed inwardly in advance by the projection 72, it is possible to restrict rigidity of the bottom surface 68 and facilitate its flexing as compared with that of the first to third preferred embodiments and further to cause the bottom surface to receive the external pressure and make a rapid flexing.

Figure 16A:
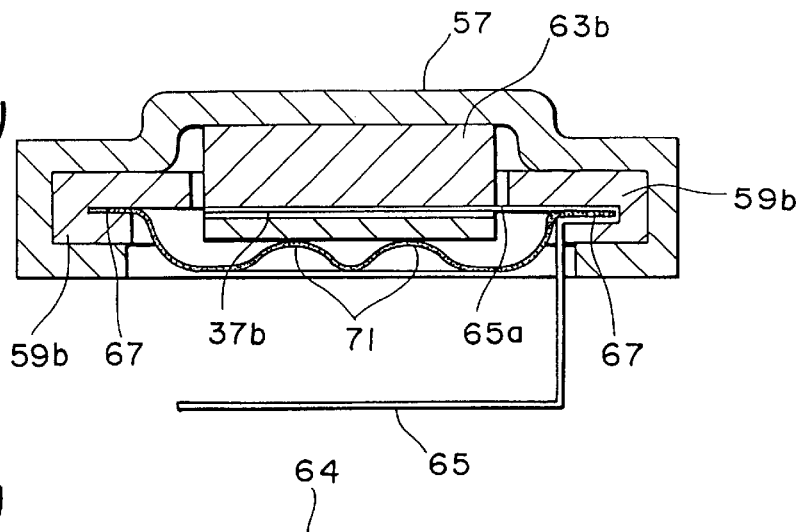
FIGS. 16(A), 16(B) and 16(C) are sectional views taken in a width-wise direction of the protection device of the fourth preferred embodiment of the present invention, wherein 16(A) is a view taken at one end, 16(B) is a view taken at a central part and 16(C) is a view taken at the other end.
Figure 16B:
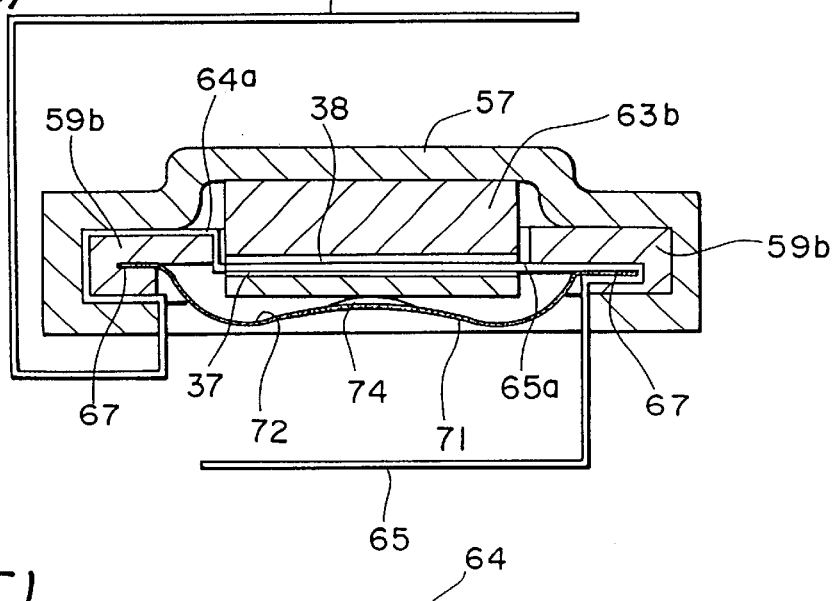
Figure 16C:
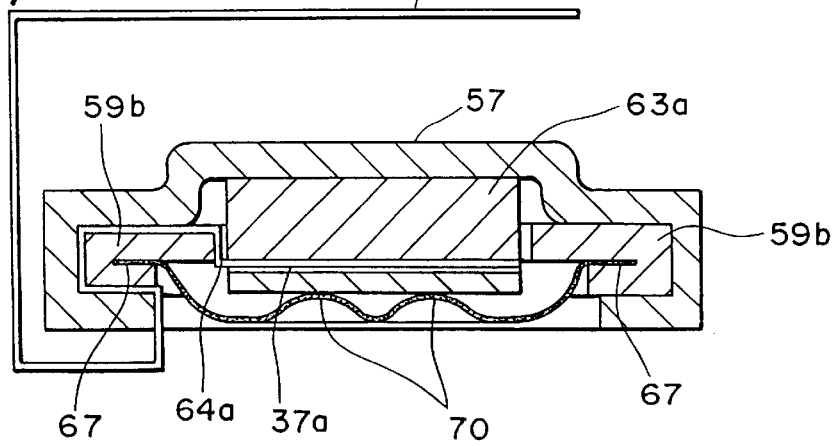

This lid member 66 is constructed such that its edges 67 are abutted against the inner wall of the upper surface 59a of the holding member 59 and at the same time, as shown in FIG. 16, its projections 70, 71, 74 are abutted against the lower surface of the electrical conduction passage 36 and then the lid member is stored in the inner hollow part of the holding member 59. Then, the lid member 66 is held and supported while its edges 67 are closely contacted with the side surfaces 59b bent inwardly and the upper surface 59a of the holding member 59.

In addition, the holding member 59 is fixed while its side surfaces 59b are bent by the inward bent side surfaces 56b of the casing 56, the outer wall of the upper surface 59a is abutted against the upper surface 56a of the casing 56 and then the holding member 59 is held by the upper surface 56a and the side surfaces 56b. As a result, each of the upper surface 59a and the side surfaces 59b is closely contacted with the inner walls of the upper surface 56a and the side surfaces 56b of the casing 56 by resiliency of the holding member 59 without any clearance, thereby an inner part enclosed by the casing 56, the holding member 59 and the lid member 66 is sealing closed and the electrical conductive passage 36 is positioned in it.

Also not illustrated in the figure, this protection device is set such that the wiring members 64, 65 are connected to the positive electrode lid 23 and the positive electrode 24 and assembled in the lithium ion secondary battery cell as shown in FIG. 6, the lid member 66 is flexed inwardly due to an increased pressure within the lithium ion secondary battery cell, and an electrical current flowing between the positive electrode lid 23 and the positive electrode 24 is shielded by breaking the electrical conductive passage 36.

Also in the fourth preferred embodiment, the lid member 66 is constructed to have a resiliency, although the casing 56 may be constructed to have a resiliency.

The protection device illustrated as a fifth preferred embodiment in FIGS. 17 to 20 is comprised of a casing 75, a holding member 79, an electrical conduction passage 36, electrical conducting members 84, 85 and a lid member 87.

Figure 17:
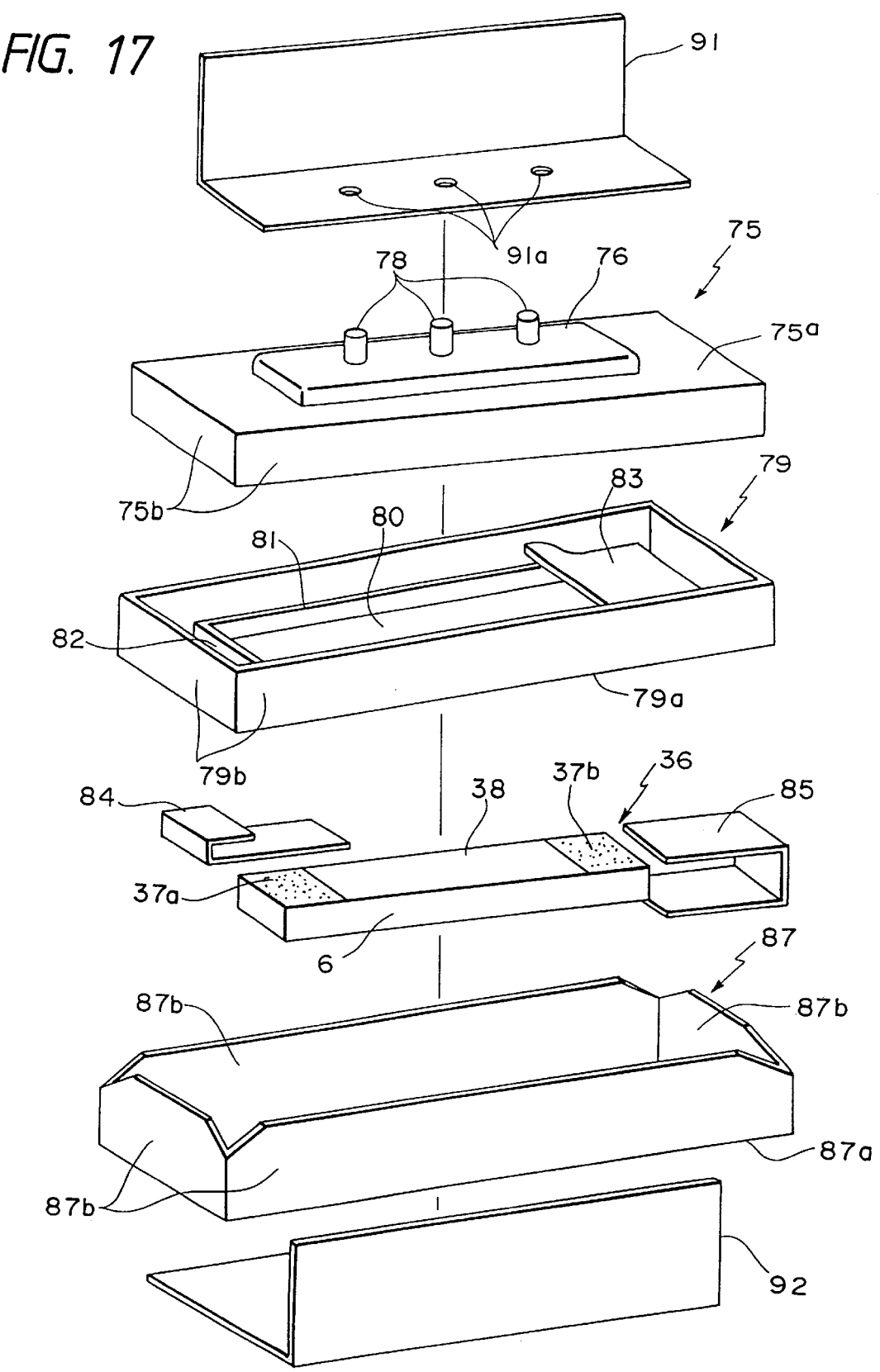
FIG. 17 is a perspective view for showing the protection device of the fifth preferred embodiment of the present invention.

The casing 75 with an inner hollow part made of material such as aluminum is comprised of an upper surface 75a and side surfaces 75b, has the same constitution as that of the casing 2 shown in the first preferred embodiment, the central part of the upper surface 75a is provided with a projection 76 projecting upwardly in a rectangular shape and then a concave part 77 is provided in the casing 75. Then, as shown in FIG. 17, the projection 76 is integrally formed with a row of three columns 78 spaced apart by a certain distance in a longitudinal direction.

Figure 18:
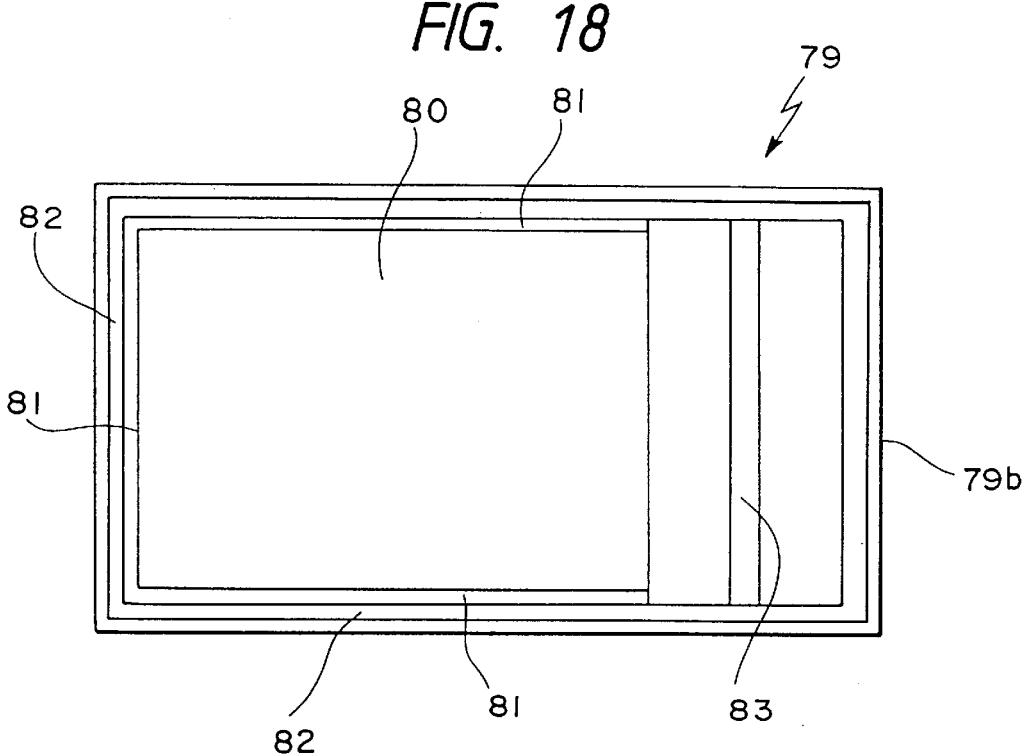
FIG. 18 is an enlarged top plan view for showing an upper surface of the holding member which is a composing element of the protection device of the fifth preferred embodiment of the present invention.
Figure 19:
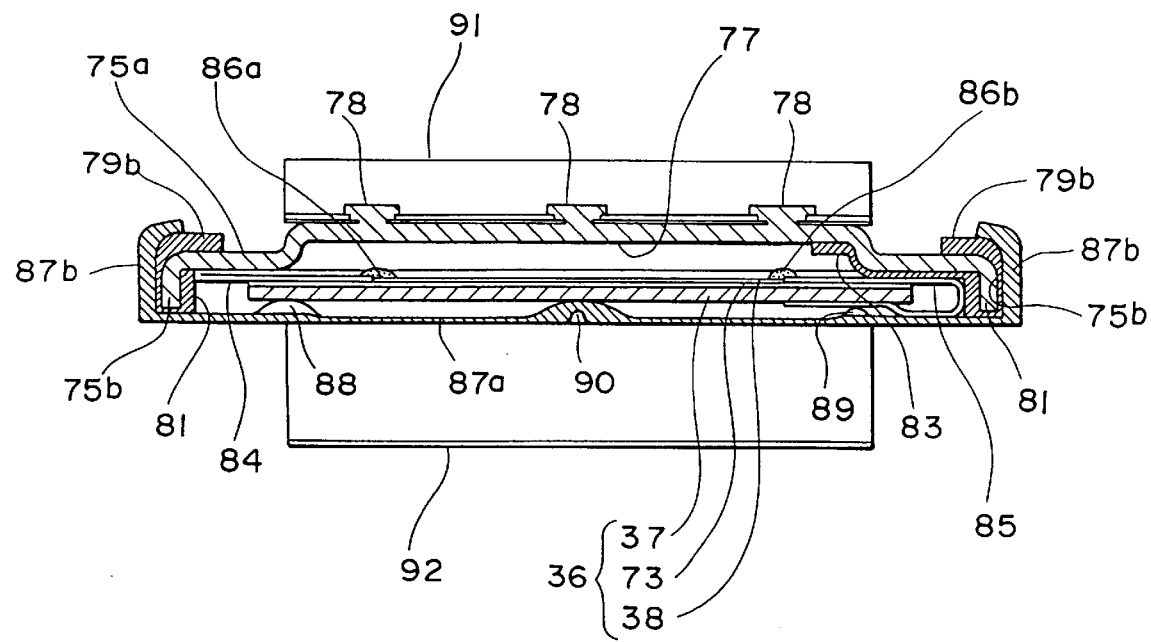
FIG. 19 is a sectional view taken in a longitudinal direction of the protection device of the fifth preferred embodiment of the present invention.

A casing-like insulating holding member 79 with an inner hollow part made of rubber material is comprised of a lower surface 79a and side surfaces 79b, and as shown in FIG. 18, the lower surface 79a is provided with a rectangular opening 80, the inner wall of the lower surface 79a is formed with projections 81 along the entire edges of the opening 60, thereby grooves 82 are formed between the inner walls of the side surfaces 79b and the projections 81. An extending part 83 extending from one end in a short direction of the projection 81 is arranged to cover a part of the opening 80.

The holding member 79 stores the casing 75 within the inner hollow part and the grooves 82 are closely contacted and fitted to the side surfaces 75b of the casing 75. In addition, the extending part 83 is abutted against the upper surface 75a of the casing 75 and an extremity end of the extending part 83 is fed out into a concave part 77 of the casing 75.

Electrical conducting connecting members 84, 85 which can be bent have a U-shaped section. The connecting member 84 is mounted on the pulling-out part 37a of the electrical conducting passage 36 and fixed by a soldering 86a. In addition, the connecting member 85 is fitted with the electrical conducting passage 36 at the pulling-out part 37b and fixed by a soldering part 86a while the pulling-out part 37b of the electrical conducting passage 36 is being pulled out at its lower surface.

Under this condition, the electrical conducting passage 36 is stored in the opening 80 of the holding member 79, bridged in a longitudinal direction over a concave part 77 of the casing 75, the connecting member 84 is pushed against the projections 81 of the holding member 79 and against the inner wall of the upper surface 75a of the casing 75, abutted thereto while being deformed and further a connecting member 85 is abutted against the projections 81 and extending part 83 of the holding member 79. In addition, there are provided clearances at both ends of the concave part 77 in a width-wise direction in the same manner as that of the first and second preferred embodiments and then it can be immersed into the concave part 77. A depth of the concave part 77 is set to such a size as one enabling the electrical conducting passage 36 to be cracked in it. And in this case, movements of the electrical conducting passage 36 in its longitudinal or width-wise direction as well as its vertical direction are restricted by the projections 81 in such away that it may be contacted with the casing 75 and the extending part 83 of the projections 81 at a predetermined location through the connecting members 84, 85.

A casing-like lid member 87 made of electrical conducting material such as aluminum which can be flexed is comprised of a lower surface 87a and side surfaces 87b, wherein the lower surface 87a can be flexed inwardly with the external pressure, both ends of the lower surface 87a are formed with a pair of spaced-apart projections 88, 89 projecting upwardly in its short direction, and the central part of the lower surface 87b is formed with one projection 90 projecting upwardly.

This lid member 87 stores the holding member 79 in it, and each of the inner walls of the lower surface 87a and the side surfaces 87b is abutted against the outer walls of the lower surface 79a of the holding member 79 and the side surfaces 79b. In addition, when the holding member 79 is stored, the projections 88, 90 of the lid member 87 is abutted at a central part against one end of the lower surface of the electrical conducting passage 36, and the projection 89 of the lid member 87 is abutted against the connecting member 85 fitted to the electrical conduction passage 36.

In addition, the holding member 79 is fixed while it is closely contacted to the side surfaces 87b of the lid member 87, side surfaces 75b and upper surface 75a of the casing 75 by a method wherein the side surfaces 79b are bent by the inward bent side surfaces 87b of the lid member 87. With such an arrangement as above, an inner part enclosed by the casing 75, the holding member 79 and the lid member 87 is sealingly closed and then the electrical conducting passage 36 is positioned in it.

As a result, the upper surface of the electrical conducting passage is pushed toward the concave part 77 of the casing 75 by projections 88, 89, 90 of the lid member 87, the pulling-out part 37a is always contacted with the inner wall of the upper surface 75a of the casing 75 through the connecting member 84, the pulling-out part 37b is always contacted with the projection 89 of the lid member 87 through the connecting member 85, resulting in that the casing 75 and the lid member 87 are made electrically conductive through the electrical conducting passage.

Figure 20:
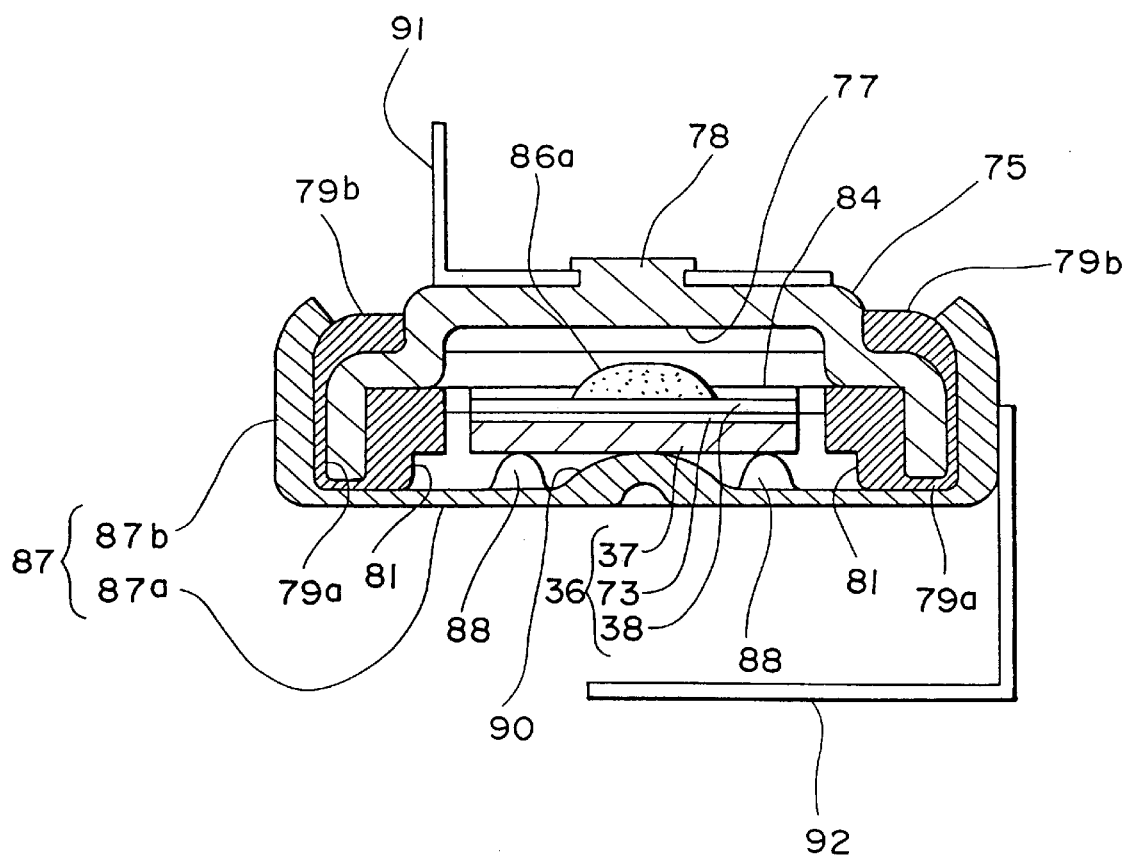
FIG. 20 is a sectional view taken in a width-wise direction at a central part of the protection device of the fifth preferred embodiment of the present invention.

In addition, the protection device is provided with rectangular electrical conductive foils 91, 92 acting as external pulling-out terminals of the electrical conducting passage 36, and as shown in FIG. 20, the electrical conducting foil 91 has its bore part 91a inserted into the column 78 of the casing 75, the column part 78 is struck to be deformed and fixed to the upper surface 75a of the casing 75. In addition, the electrical conductive foil 92 is fixed to the outer walls of the side surfaces 87b of the lid member 87 by an ultrasonic wave melting and fixing.

Also not shown in the figure, this protection device is set such that the electrical conductive foils 91, 92 are connected to the positive electrode lid 23 and the positive electrode 24 as shown in FIG. 6 and assembled in the lithium ion secondary battery cell, the lid member 87 is flexed inwardly due to an increased pressure within the lithium ion secondary battery cell so as to crack the electrical conductive passage 36 and to shield an electrical current flowing between the positive electrode lid 23 and the positive electrode 24.

Also in the fifth preferred embodiment, the lid member 87 is constructed to have a flexibility, although the casing 75 may have a flexible characteristic.

The protection device in the present invention as described above is constructed such that either the electrical conducting casing or the lid member has a flexible characteristic, so that it is possible to break the electrical conducting passage to cut off an electrical conduction between the casing and the lid member due to the flexing of either the casing or the lid member with the external pressure.

In addition, the protection device in the present invention enables an electrical conduction between a pair of wiring members arranged in the electrical conducting passage to be shielded by breaking the electrical conducting passage with flexing of either the casing or the lid member under the external pressure due to the fact that either the insulating casing or the insulating lid member has a flexible characteristic.

In addition, the protection device of the present invention is constructed such that the electrical conductive casing and the electrical conductive and flexing lid member are connected to each other through the holding member in such a way that the inner part of the casing is sealingly closed, the electrical conductive passage is positioned within the sealingly closed space so as to cause the aforesaid casing and the aforesaid lid member to be electrically conductive to each other and at the same time, the aforesaid lid member is provided with a projection at a position opposing against the central part of the aforesaid electrical conducting passage while being abutted against the aforesaid electrical conductive passage, the aforesaid projection breaks the aforesaid electrical conductive passage by a flexing of the aforesaid lid member with the external pressure, thereby an electrical conduction between the aforesaid casing and the aforesaid lid member can be broker by breaking the aforesaid electrical conductive passage with the aforesaid projection.

In addition, the protection device of the present invention is constructed such that the insulating casing and the lid member having an insulating characteristic and a flexibility are connected to each other through the holding member in such a way that the inner part of the aforesaid casing is sealingly closed, the electrical conductive passage is positioned in the sealingly closed inner part, a pair of wiring members are extended out of the aforesaid electrical conductive passage, a projection is arranged at a position of the aforesaid lid member opposing against the center of the aforesaid electrical conductive passage while being abutted against the electrical conductive passage, the aforesaid electrical conductive passage is broken by the aforesaid projection due to the flexing of the aforesaid lid member with the external pressure, thereby the electrical conduction between the aforesaid pair of wiring members can be cut off.

In addition, the protection device having the aforesaid inner part sealingly closed is constructed such that the bottom surface of the aforesaid lid member is formed with the projection projecting inwardly of the aforesaid casing at the position opposing against the aforesaid electrical conductive passage, the projection is provided with the aforesaid projection, thereby the aforesaid lid member is flexed in advance, so that it is possible to reduce a rigidity of the aforesaid lid member and further to facilitate its flexing against the external pressure.

In addition, the protection device in which the aforesaid inner part is sealingly closed and the aforesaid casing and the aforesaid lid member are electrically conductive through the aforesaid electrical conductive passage is constructed such that each of the aforesaid casing and the aforesaid lid member is provided with the electrical conductive foil so as to cause them to be electrically conductive, the aforesaid metallic foil is applied as the external pulling-out terminal in the aforesaid electrical conductive passage, thereby its connection with the external device can be facilitated.

In addition, the protection device in which the aforesaid inner part is sealingly closed and the aforesaid pair of wiring members are extended out of the device is constructed such that the aforesaid electrical passage is formed with an electrode at the surface of the ceramic substrate, thereby the aforesaid projection arranged at the aforesaid lid member can break the aforesaid electrical conductive passage through flexing of the aforesaid lid member with the external pressure.

In addition, the protection device in which the aforesaid inner part is sealingly closed and the aforesaid pair of wiring members are extended out of the device is constructed such that the aforesaid electrical conductive passage and the aforesaid pair of wiring members are integrally arranged to enable the number of component parts and the number of manufacturing steps to be reduced.

In addition, the protection device in which the aforesaid inner part is sealingly closed and the aforesaid casing and the aforesaid lid member are electrically conductive through the aforesaid electrical conductive passage is installed within the battery cell, the internal electrode and the external electrode of the aforesaid battery cell are connected to the aforesaid casing and the aforesaid lid member, the aforesaid internal electrode and the aforesaid external electrode are electrically conductive through the aforesaid electrical conductive passage, thereby an increased gas pressure within the battery cell is received as the external pressure to cause the aforesaid lid member to be flexed and thus the aforesaid electrical conductive passage is broken to enable the electrical conduction between the aforesaid internal electrode and the aforesaid external electrode to be broken.

In addition, the protection device in which the aforesaid inner part is sealingly closed and the aforesaid pair of wiring members are extended out of the device is installed in the battery cell, the aforesaid pair of wiring members are connected to the internal electrode and the external electrode of the aforesaid battery cell, the aforesaid internal electrode and the aforesaid external electrode are electrically conductive through the aforesaid electrical conductive passage, thereby the increased air pressure within the battery cell is received as the external pressure to cause the aforesaid lid member to be flexed and the aforesaid electrical conductive passage is broken and the electrical conduction between the aforesaid internal electrode and the aforesaid external electrode can be broken.

As a result, since the increased air pressure within the battery cell is uniformly transmitted into the battery cell, the aforesaid protection can be located at any position within the battery cell, a degree of freedom in designing the battery cell can be improved, and at the same time the protection device having the aforesaid sealingly closed inner part is assembled in the battery cell, thereby it is possible to provide the protection device and the battery cell having the protection device in which a use of the battery cell having the increased air pressure can be positively prohibited.

What is claimed is:

1. A protection device comprising:
   an electrically insulative casing;
   an electrically insulative lid member;
   a breakable member arranged in a space between said casing and said lid member, said breakable member including an insulting member having an electrically conductive layer formed thereon; and
   a pair of wiring members, one of said wiring members being connected to one end of the electrically conductive layer of said breakable member and the other wiring member being connected to an opposite end of the electrically conductive layer of said breakable member, said wiring members extending out of said casing,
   wherein said breakable member is broken by a flexing of said casing or said lid member in response to an applied pressure, thereby cutting off electrical conduction between said pair of wiring members by severing the electrically conductive layer.

2. A protection device comprising:

an insulating casing having an inner hollow part, an electrically conductive breakable member stored in said casing, a pair of wiring members, one of said wiring members being connected to one end of said breakable member and the other wiring member being connected to an opposite end of said breakable member, said pair of wiring members being electrically connected through said breakable member, a resilient and insulating holding member stored in said casing and for holding said breakable member, and a flexible, electrically conductive lid member connected to said casing through said holding member in such a way that the hollow inner part of said casing is sealingly closed, wherein said breakable member is held by said lid member and said casing, wherein said pair of wiring members are extended out of a space sealingly closed by said casing, said holding member and said lid member, wherein said lid member is provided with a projection which is abutted against said breakable member at a position adjacent to a central part of said breakable member, and wherein said projection breaks said breakable member by flexing of said lid member in response to an applied pressure so as to cut off an electrical conduction between said pair of wiring members.

3. A protection device according to claim 2, wherein said breakable member includes a ceramic substrate and an electrically conductive layer formed on a surface of the ceramic substrate, one end of said electrically conductive layer being connected to one of said pair of wiring members, the other end of said electrically conductive layer being connected to the other wiring member.

4. A protection device according to claim 2, characterized in that said breakable member and said pair of wiring members are formed of electrical conductive plates.

5. A protection device according to claim 2, wherein a bottom surface of said lid member is formed with a projection projecting toward said casing and abutting against said breakable member.

* * * * *